US011424678B2

(12) United States Patent
Nam

(10) Patent No.: US 11,424,678 B2
(45) Date of Patent: Aug. 23, 2022

(54) FREQUENCY LIMIT CIRCUIT AND DC-DC CONVERTER INCLUDING THE SAME

(71) Applicant: Samsung Electronics Co., Ltd., Suwon-si (KR)

(72) Inventor: Hyunseok Nam, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 148 days.

(21) Appl. No.: 16/939,272

(22) Filed: Jul. 27, 2020

(65) Prior Publication Data

US 2021/0194365 A1  Jun. 24, 2021

(30) Foreign Application Priority Data

Dec. 23, 2019 (KR) .......................... 10-2019-0173269

(51) Int. Cl.
*H02M 3/158* (2006.01)
*H02M 1/08* (2006.01)

(52) U.S. Cl.
CPC ............. *H02M 3/158* (2013.01); *H02M 1/08* (2013.01)

(58) Field of Classification Search
CPC ...... H02M 1/08; H02M 3/158; H02M 3/1582; H02M 3/157; H02M 3/156
See application file for complete search history.

(56) References Cited

U.S. PATENT DOCUMENTS

| 7,309,977 | B2 | 12/2007 | Gray et al. |
| 8,624,573 | B2 | 1/2014 | Yu et al. |
| 8,933,685 | B2 | 1/2015 | Adeeb et al. |
| 9,300,212 | B2 | 3/2016 | Notman et al. |
| 9,459,635 | B2 | 10/2016 | Dally |
| 9,467,043 | B2 | 10/2016 | Xue et al. |
| 10,110,126 | B2 | 10/2018 | Childs et al. |
| 2010/0013451 | A1* | 1/2010 | Nakamura .......... H02M 3/1588 323/282 |
| 2013/0169248 | A1* | 7/2013 | Zhang .................... H02M 3/158 323/271 |
| 2014/0232361 | A1* | 8/2014 | Dally ...................... G06F 1/305 324/705 |

FOREIGN PATENT DOCUMENTS

| JP | 20100104182 A | 5/2010 |
| JP | 6403965 B2 | 10/2018 |
| KR | 20050015121 A | 2/2005 |

* cited by examiner

*Primary Examiner* — Nguyen Tran
(74) *Attorney, Agent, or Firm* — Harness, Dickey & Pierce, P.L.C.

(57) ABSTRACT

A frequency limit circuit includes a frequency-voltage converter, a compensation voltage generator and a compensator. The frequency-voltage converter generates a conversion voltage proportional to an operation frequency of the DC-DC converter based on a pulse-frequency modulation (PFM) voltage control signal indicating the operation frequency. The compensation voltage generator generates a compensation voltage based on a difference between the conversion voltage and a frequency limit voltage. The compensator adjusts a compensation current at an output node of the DC-DC converter based on the compensation voltage to restrict the operation frequency. The operation frequency of the DC-DC converter may be restricted efficiently by adjusting the compensation current through the negative feedback operation.

20 Claims, 17 Drawing Sheets

522

FREQUENCY LIMIT CIRCUIT AND DC-DC CONVERTER INCLUDING THE SAME

CROSS-REFERENCE TO RELATED APPLICATION

This U.S. non-provisional application claims priority under 35 USC § 119 to Korean Patent Application No. 10-2019-0173269, filed on Dec. 23, 2019, in the Korean Intellectual Property Office (KIPO), the disclosure of which is incorporated by reference herein in its entirety.

BACKGROUND

1. Technical Field

Example embodiments relate generally to semiconductor integrated circuits, and more particularly to a frequency limit circuit and a DC-DC converter including the frequency limit circuit.

2. Discussion of the Related Art

A voltage converter, which converts a relatively high direct current (DC) voltage to a relatively low DC voltage, is typically employed to provide power to electronic devices. The voltage converter may be included in various devices and systems such as mobile devices, electric motor vehicles, etc. A voltage converter typically has high performance and high efficiency. For example, to rapidly charge various batteries, the voltage converter should convert a high DC voltage to a low DC voltage with high efficiency. An operation frequency of the voltage converter may affect neighboring circuits in an electronic system and thus characteristics of the operation frequency have to be considered. For example, the operation frequency lower than an audible frequency may cause noises in particular components and degrade performance and/or reliability of an entire system in which the voltage converter is included.

SUMMARY

Some example embodiments may provide a frequency limit circuit and a DC-DC converter including the frequency limit circuit capable of more efficiently restricting an operation frequency of the DC-DC converter.

Some example embodiments may provide a method of controlling an operation of a DC-DC converter capable of more efficiently restricting an operation frequency of the DC-DC converter.

According to example embodiments, a frequency limit circuit includes a frequency-voltage converter, a compensation voltage generator and a compensator. The frequency-voltage converter generates a conversion voltage proportional to an operation frequency of the DC-DC converter based on a pulse-frequency modulation (PFM) voltage control signal indicating the operation frequency. The compensation voltage generator generates a compensation voltage based on a difference between the conversion voltage and a frequency limit voltage. The compensator adjusts a compensation current at an output node of the DC-DC converter based on the compensation voltage to restrict the operation frequency.

According to example embodiments, a DC-DC converter includes a voltage conversion circuit configured to generate an output voltage at an output node by converting a power supply voltage based on a voltage control signal, a voltage control circuit configured to generate the voltage control signal based on a feedback voltage proportional to the output voltage, and a frequency limit circuit configured to restrict an operation frequency of the DC-DC converter based on the voltage control signal. The frequency limit circuit includes a frequency-voltage converter configured to generate a conversion voltage proportional to the operation frequency of the DC-DC converter based on a pulse-frequency modulation (PFM) voltage control signal indicating the operation frequency, a compensation voltage generator configured to generate a compensation voltage based on a difference between the conversion voltage and a frequency limit voltage, and a compensator configured to adjust a compensation current at an output node of the DC-DC converter based on the compensation voltage to restrict the operation frequency.

According to example embodiments, a method of controlling an operation of a DC-DC converter, includes, detecting an operation frequency of the DC-DC converter operating in a pulse-frequency modulation (PFM) mode, generating a conversion voltage proportional to the operation frequency, generating a compensation voltage based on a difference between the conversion voltage and a frequency limit voltage, and adjusting a compensation current at an output node of the DC-DC converter based on the compensation voltage to restrict the operation frequency.

The frequency limit circuit, the DC-DC converter and the associated method according to example embodiments may more efficiently limit the operation frequency of the DC-DC converter and more efficiently reduce audible frequency noises and/or electromagnetic interference in devices and systems including the DC-DC converter by adjusting the compensation current through a negative feedback operation.

BRIEF DESCRIPTION OF THE DRAWINGS

Example embodiments of the present disclosure will be more clearly understood from the following detailed description taken in conjunction with the accompanying drawings.

DETAILED DESCRIPTION OF EXAMPLE EMBODIMENTS

Figure 1:
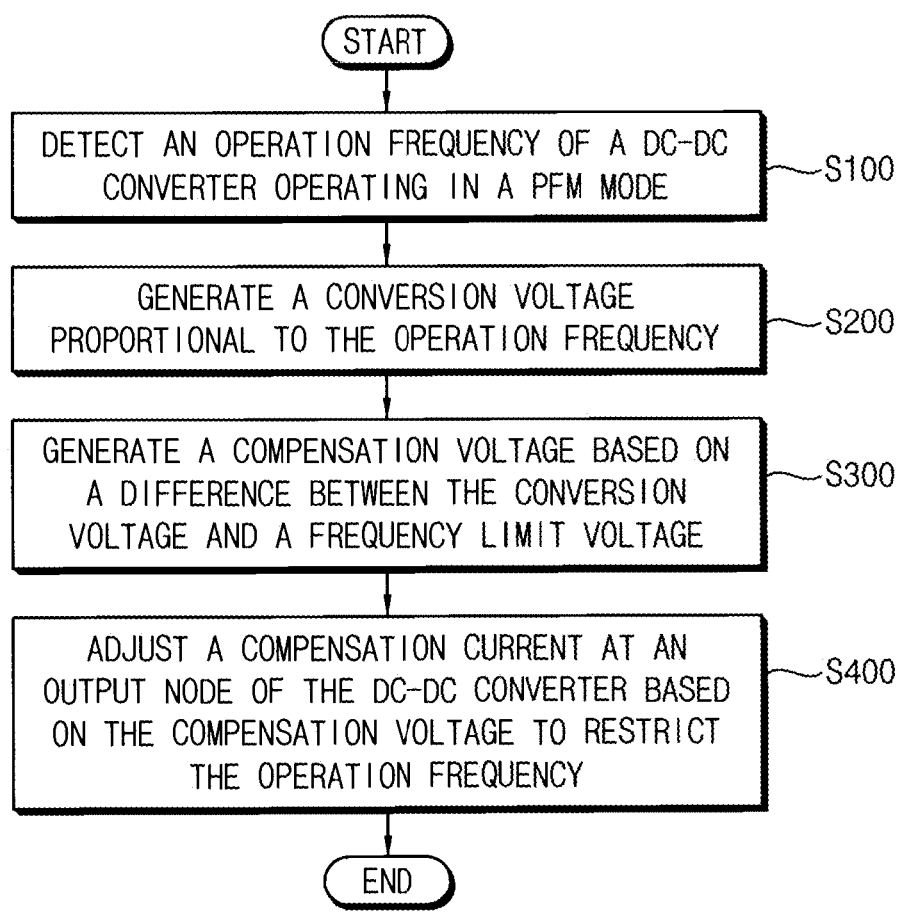
FIG. 1 is a flow chart illustrating a method of controlling an operation of a DC-DC converter according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flow chart illustrating a method of controlling an operation of a DC-DC converter according to example embodiments.

Referring to FIG. 1, an operation frequency of a direct current (DC)-DC converter operating in a PFM mode is detected (S100). In the PFM mode, the DC-DC converter may generate a PFM voltage control signal including pulses corresponding to the operation frequency and detect the operation frequency based on the PFM voltage control signal. Example embodiments of generating the PFM voltage control signal will be described below with reference to FIGS. 3 and 12.

A conversion voltage proportional to the operation frequency is generated (S200). Example embodiments of generating the conversion voltage will be described below with reference to FIGS. 4 through 11.

A compensation voltage is generated based on a difference between the conversion voltage and a frequency limit voltage (300) and a compensation current at an output node of the DC-DC converter is adjusted based on the compensation voltage to restrict the operation frequency (S400). As will be described below, an amount of the compensation current may be adjusted by a negative feedback operation such that the conversion voltage converges to the frequency limit voltage.

In some example embodiments, the frequency limit voltage may correspond to a lowest frequency limit voltage to restrict the operation frequency to be higher than a lowest value, and the compensation current may correspond to a discharging current flowing from the output node of the DC-DC converter to a ground voltage.

In some example embodiments, the frequency limit voltage may correspond to a highest frequency limit voltage to restrict the operation frequency to be lower than a highest value, and the compensation current may correspond to a charging current flowing from a power supply voltage to the output node of the DC-DC converter.

As such, the method according to example embodiments may more efficiently limit the operation frequency of the DC-DC converter and more efficiently reduce audible frequency noises and/or electromagnetic interference in devices and systems including the DC-DC converter by adjusting the compensation current through a negative feedback operation.

Figure 2:
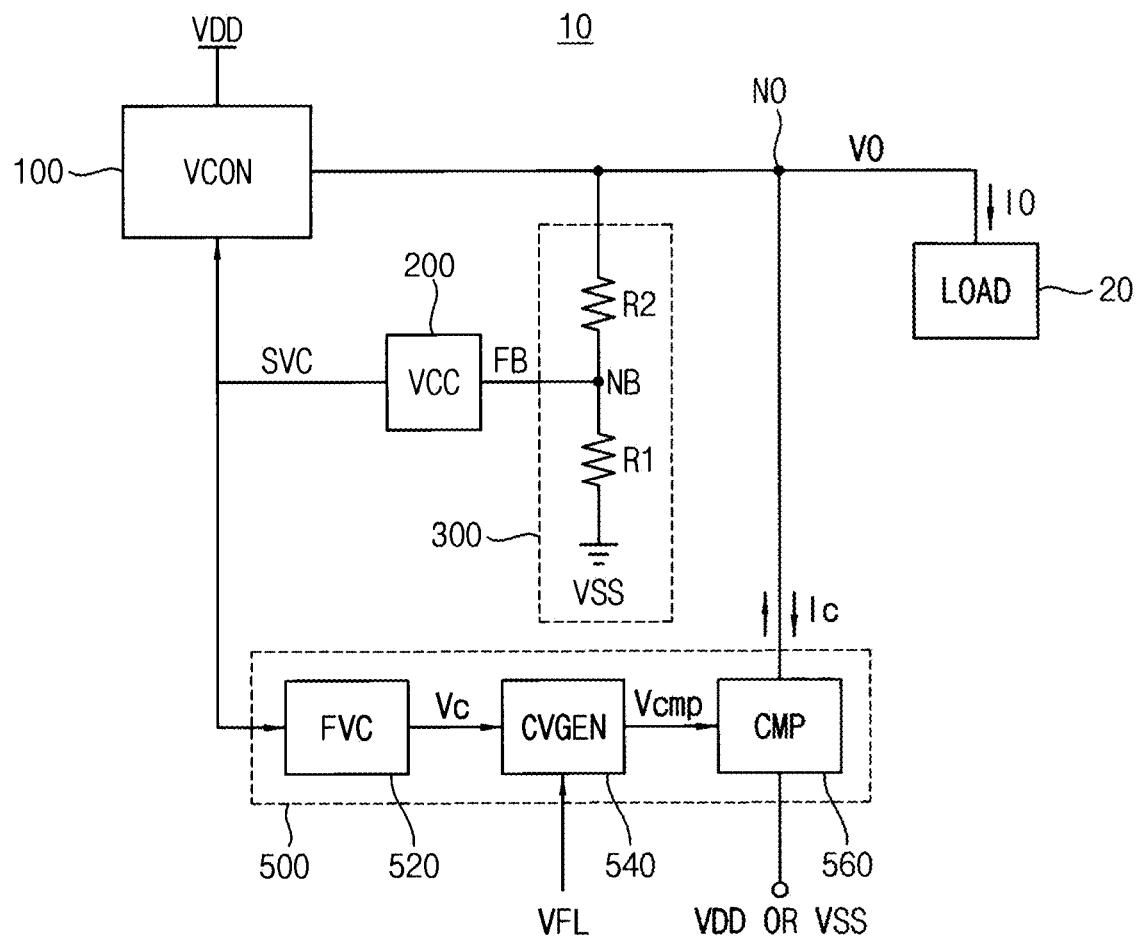
FIG. 2 is a diagram illustrating a DC-DC converter including a frequency limit circuit according to example embodiments.

FIG. 2 is a diagram illustrating a DC-DC converter 10 including a frequency limit circuit according to example embodiments.

Referring to FIG. 2, a DC-DC converter 10 may include a voltage conversion circuit VCON 100, a voltage control circuit VCC 200, a feedback circuit 300 and/or a frequency limit circuit 500. FIG. 2 also illustrates a load 20 that is connected to an output node NO of the DC-DC converter 10.

The voltage conversion circuit 100 may generate an output voltage VO at an output node NO by converting an input voltage (e.g., a power supply voltage VDD) based on a voltage control signal SVC. A configuration of the voltage conversion circuit 100 may be implemented in many different ways, depending on the function of the DC-DC converter 10.

In some example embodiments, the voltage conversion circuit 100 may have a configuration corresponding to a buck converter (or step-down converter) to convert a relatively high DC voltage to a relatively low DC voltage.

In some example embodiments, the voltage conversion circuit 100 may have a configuration corresponding to a boost converter (or step-up converter) to convert a relatively low DC voltage to a relatively high DC voltage.

In some example embodiments, the voltage conversion circuit 100 may have a configuration corresponding to a buck-boost converter to convert an input DC voltage to an output DC voltage having a higher or lower voltage level than the input DC voltage.

The voltage control circuit 200 may generate the voltage control signal SVC based on a feedback voltage FB that is proportional to the output voltage VO. As will be described below, the voltage control circuit 200 may include a pulse-frequency modulation (PFM) controller supporting a PFM mode while the DC-DC converter 10 operates based on the operation frequency that is varied. According to example embodiments, the voltage control circuit 200 may further include a pulse-width modulation (PWM) controller supporting a PWM mode while the DC-DC converter 10 operates based on the operation frequency that is fixed.

As will be described below with reference to FIGS. 15 and 16, the PFM controller may generate a PFM voltage control signal SPFM as the voltage control signal SVC in the PFM mode, and the PWM controller may generate a PWM voltage control signal SPFM as the voltage control signal SVC in the PWM mode. The DC-DC converter 10 may operate in the PWM mode while a load current IO flowing from the output node NO of the DC-DC converter 10 to the load 20 is higher than a reference value. In contrast, the DC-DC converter 10 may operate in the PFM mode while the load current IO is lower than the reference value.

The feedback circuit 300 may generate the feedback voltage FB that is proportional to the output voltage VO. For example, as illustrated in FIG. 2, the feedback circuit 300 may include resistors R1 and R2 to generate the feedback voltage FB corresponding to a ratio of resistance values of the resistors R1 and R2, but example embodiments are not limited thereto. In the example embodiment of FIG. 2, the feedback voltage FB is determined by a relation of FB=VO*R1/(R1+R2).

The frequency limit circuit 500 may restrict the operation frequency of the DC-DC converter 10 based on the voltage control signal SVC in the PFM mode. The operation frequency may be restricted in the PFM mode while the operation frequency is varied. Hereinafter, the voltage control signal SVC may be considered as the PFM voltage control signal SPFM if it is not mentioned particularly that the voltage control signal SVC corresponds to the PWM voltage control signal.

As illustrated in FIG. 2, the frequency limit circuit 500 may include a frequency-voltage converter FVC 520, a compensation voltage generator CVGEN 540 and/or a compensator CMP 560.

The frequency-voltage converter 520 may generate a conversion voltage Vc proportional to the operation frequency of the DC-DC converter 10 based on the PFM voltage control signal SPFM indicating the operation frequency. The frequency-voltage converter 520 will be further described below with reference to FIGS. 4 through 11.

The compensation voltage generator 540 may generate a compensation voltage Vcmp based on a difference between the conversion voltage Vc and a frequency limit voltage VFL. The compensator 560 may adjust a compensation current Ic at the output node NO of the DC-DC converter 10 based on the compensation voltage Vcmp to restrict the operation frequency.

In some example embodiments, as will be described below with reference to FIG. 3, the frequency limit voltage VFL may correspond to a lowest frequency limit voltage VFLd to restrict the operation frequency to be higher than a lowest value, and the compensation current Ic may correspond to a discharging current Idisc flowing from the output node NO of the DC-DC converter 10 to a ground voltage VSS. In an example embodiment of FIG. 3, the compensation voltage generator 540 may include an amplifier including a positive input terminal receiving the conversion voltage Vc, a negative input terminal receiving the lowest frequency limit voltage VFLd, and an output terminal generating the compensation voltage Vcmp. In addition, the compensator 560 may include an N-channel metal oxide semiconductor (NMOS) transistor connected between the output node NO of the DC-DC converter 10 and the ground voltage VSS, and the compensation voltage Vcmp may be applied to a gate electrode of the NMOS transistor.

In some example embodiments, as will be described below with reference to FIG. 14, the frequency limit voltage VFL may correspond to a highest frequency limit voltage VFLc to restrict the operation frequency to be lower than a highest value, and the compensation current Ic may correspond to a charging current Ichg flowing from the power supply voltage VDD to the output node NO of the DC-DC converter 10. In an example embodiment of FIG. 14, the compensation voltage generator 540 may include an amplifier including a positive input terminal receiving the highest frequency limit voltage VFLc, a negative input terminal receiving the conversion voltage Vc, and an output terminal generating the compensation voltage Vcmp. In addition, the compensator 560 may include a P-channel metal oxide semiconductor (PMOS) transistor connected between the output node NO of the DC-DC converter 10 and the power supply voltage VDD, and the compensation voltage Vcmp may be applied to a gate electrode of the PMOS transistor.

Figure 19:
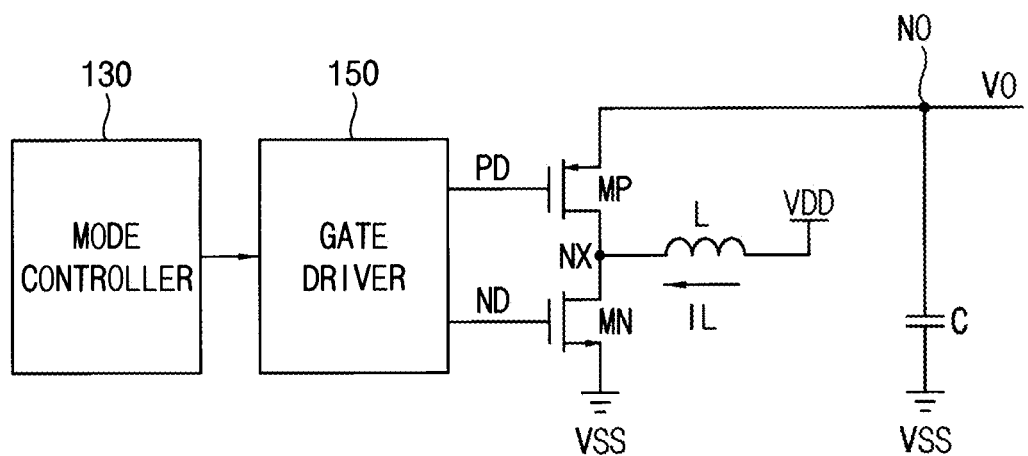
FIGS. 19 and 20 are diagrams illustrating example embodiments of a conversion circuit included in a DC-DC converter according to example embodiments.
Figure 20:
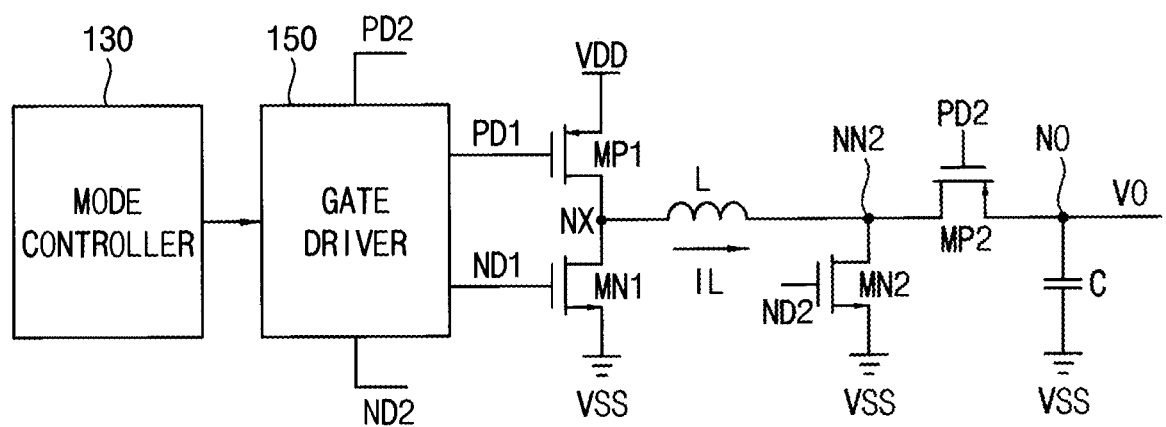

Hereinafter, non-limiting example embodiments corresponding to a buck converter (or step-down converter) are described with reference to FIGS. 3 through 18. It would be understood that example embodiments may be applied to a boost converter (or step-up converter) as illustrated in FIG. 19 and a buck-boost converter as illustrated in FIG. 20.

Figure 3:
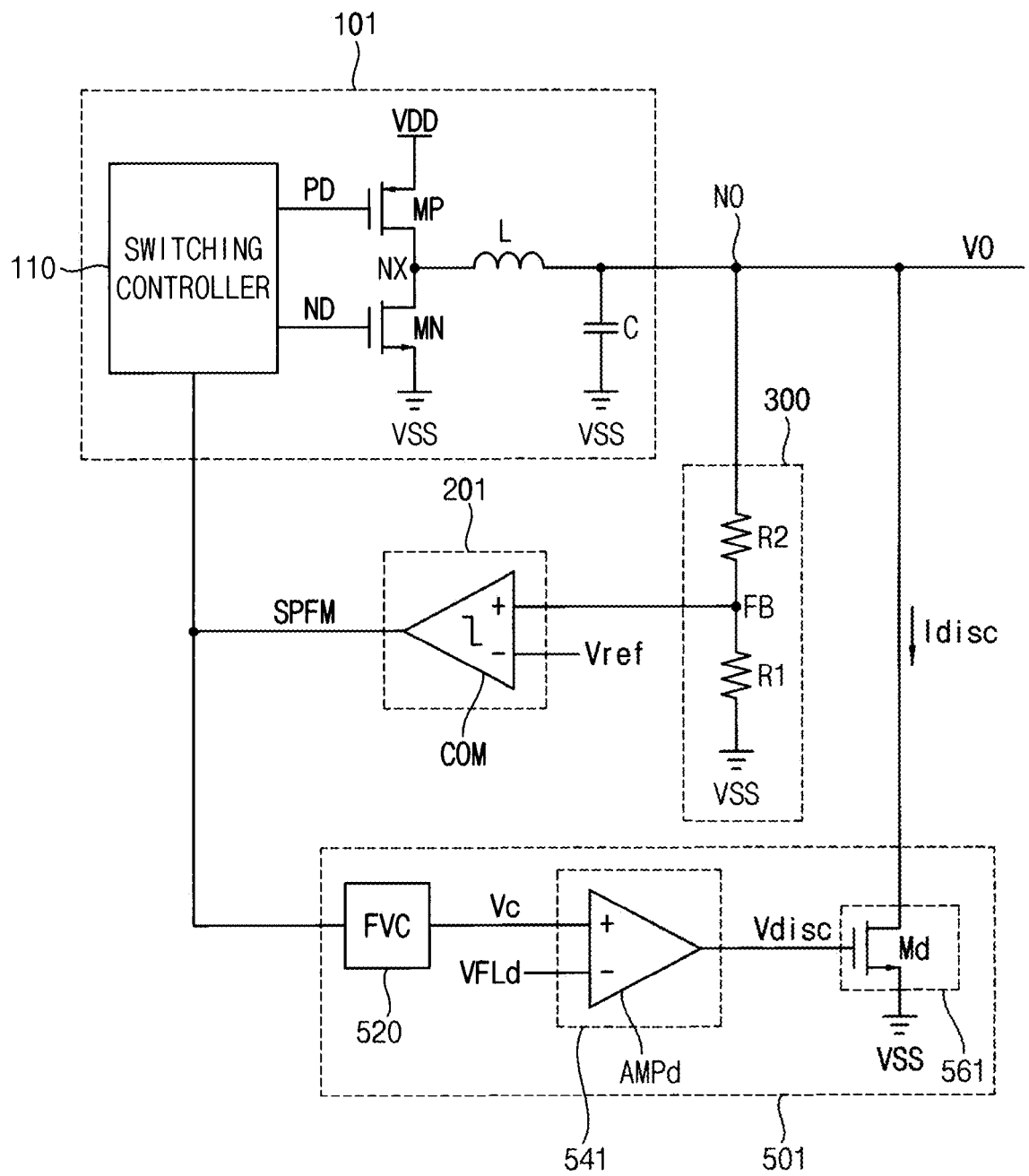
FIG. 3 is a diagram illustrating a DC-DC converter including a frequency limit circuit to restrict a lowest limit of an operation frequency in a PFM mode according to example embodiments.

FIG. 3 is a diagram illustrating a DC-DC converter 11 including a frequency limit circuit 501 to restrict a lowest limit of an operation frequency in a PFM mode according to example embodiments.

Referring to FIG. 3, a DC-DC converter 11 may include a voltage conversion circuit 101, a voltage control circuit 201, a feedback circuit 300 and/or a frequency limit circuit 501.

The voltage conversion circuit 101 may generate an output voltage VO at an output node NO by converting an input voltage, that is, a power supply voltage VDD, based on a PFM voltage control signal SPFM. The configuration of the voltage conversion circuit 101 of FIG. 3 corresponds to a buck converter (or step-down converter).

The voltage conversion circuit 101 may include a switching controller 110, a pull-up transistor MP, a pull-down transistor MN, an inductor L and/or a capacitor C.

The switching controller 110 may generate a pull-up control signal PD and a pull-down control signal ND based on the PFM voltage control signal SPFM. The pull-up transistor MP may be turned on to pull up a voltage of a switching node NX when the pull-up control signal PD is activated in a low level. The pull-down transistor MN may be turned on to pull down the voltage of the switching node NX when the pull-down control signal ND is activated in a high level. The inductor L and the capacitor C may act as a low pass filter and filter the voltage of the switching node NX to output the output voltage VO to the output node NO. The switching circuit including the pull-up transistor MP and the pull-down transistor MN and the low pass filter including the inductor L and the capacitor C may be implemented variously.

The voltage control circuit 201 may generate the PFM voltage control signal SPFM based on the feedback voltage FB that is proportional to the output voltage VO. In some example embodiments, the voltage control circuit 201 may include a comparator COM. The comparator COM may include a positive input terminal receiving the feedback voltage FB, a negative input terminal receiving a reference voltage Vref, and an output terminal generating the PFM voltage control signal SPFM. The feedback circuit 300 may generate the feedback voltage FB proportional to the output voltage VO as described with reference to FIG. 2.

The frequency limit circuit 501 may include a frequency-voltage converter FVC 520, a compensation voltage generator 541 and/or a compensator 561.

The frequency-voltage converter 520 may generate a conversion voltage Vc proportional to the operation frequency of the DC-DC converter 11 based on the PFM voltage control signal SPFM indicating the operation frequency. The frequency-voltage converter 520 will be further described below with reference to FIGS. 4 through 11.

The compensation voltage generator 541 may generate a compensation voltage Vcmp, that is, a discharging voltage Vdisc, based on a difference between the conversion voltage Vc and a lowest frequency limit voltage VFLd. The compensator 561 may adjust a compensation current Ic, that is, a discharging current Idisc, at the output node NO of the DC-DC converter 11 based on the discharging voltage Vdisc to restrict the operation frequency.

In some example embodiments, the compensation voltage generator 541 may include an amplifier AMPd including a positive input terminal receiving the conversion voltage Vc, a negative input terminal receiving the lowest frequency limit voltage VFLd, and an output terminal generating the discharging voltage Vdisc. In addition, the compensator 561 may include an NMOS transistor Md connected between the output node NO of the DC-DC converter 11 and the ground voltage VSS, and the discharging voltage Vdisc may be applied to a gate electrode of the NMOS transistor Md. The operation of the DC-DC converter 11 will be further described with reference to FIG. 12.

Figure 4:
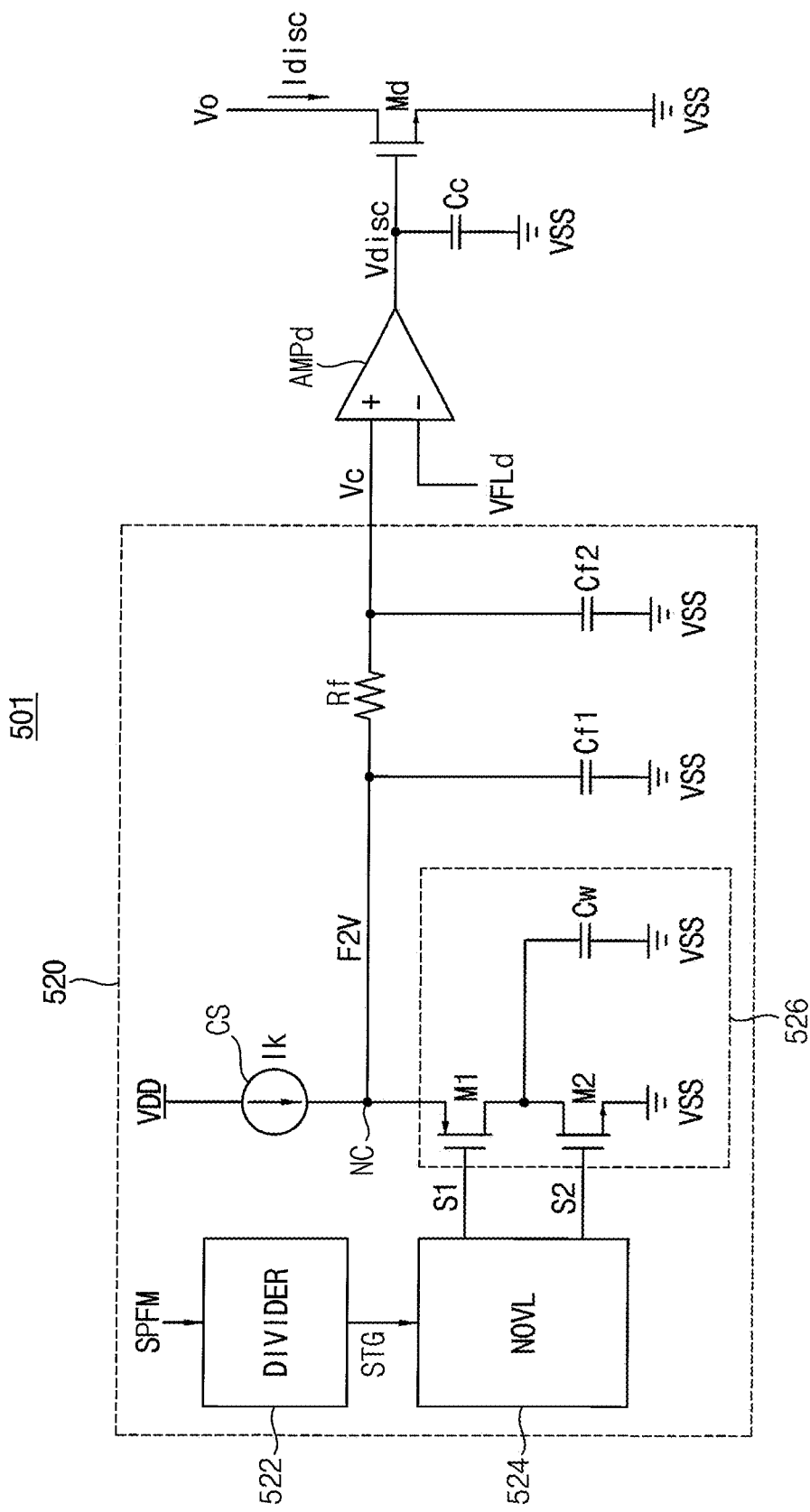
FIG. 4 is a circuit diagram illustrating an example embodiment of a frequency-voltage converter included in a frequency limit circuit according to example embodiments.

FIG. 4 is a circuit diagram illustrating an example embodiment of a frequency-voltage converter 520 included in a frequency limit circuit 501 according to example embodiments. FIG. 4 illustrates also the amplifier AMPd and the NMOS transistor Md as described with reference to FIG. 3. A capacitor Cc may be coupled between the output of the amplifier AMPd and the ground voltage VSS.

Referring to FIG. 4, a frequency-voltage converter 520 may include a frequency divider 522, a switch signal generator NOVL 524, a current source CS, a switched capacitor circuit 526, and/or a filter circuit Rf, Cf1 and Cf2.

The frequency divider 522 may generate a toggling signal STG transitioning in synchronization with a rising edge or a falling edge of pulses included in the PFM voltage control signal SPFM and provide the toggling signal STG to the switch signal generator 524. Example embodiments of the frequency divider 522 will be described below with reference to FIGS. 5 through 8.

The toggling signal STG may have a duty ratio for the stable operation of the switch signal generator 524. For example, the frequency divider 522 may generate the toggling signal STG having a duty ratio of 50% as will be described below with reference to FIGS. 5 through 8. In some example embodiments, the frequency divider 522 may be omitted and the PFM voltage control signal SPFM instead of the togging signal STG may be directly provided to the switch signal generator 524.

The switch signal generator 524 may generate a first switch signal S1 and a second switch signal S2 that are alternatively activated based on the PFM voltage control signal SPFM. When the frequency divider 522 is omitted, the switch signal generator 524 may generate the first switch signal S1 and the second switch signal S2 based on the PFM voltage control signal SPFM. Example embodiments of the switch signal generator 524 will be described below with reference to FIGS. 9 and 10.

The current source CS may provide a current Ik to a switching node NC. The current source CS may be implemented as a static current source such that the magnitude of the current Ik may be fixed.

The switched capacitor circuit 526 may discharge the switching node NC based on the first switch signal S1 and the second switch signal S2. The switched capacitor circuit 526 may include a capacitor Cw, a first NMOS transistor M1 and a second NMOS transistor M2. The capacitor Cw may include a first electrode and a second electrode and the first electrode of the capacitor Cw may be connected to the ground voltage VSS. The first NMOS transistor M1 may be connected between the second electrode of the capacitor Cw and the switching node NC. The first switch signal S1 may be applied to a gate electrode of the first NMOS transistor M1. The second NMOS transistor M2 may be connected between the second electrode of the capacitor Cw and the ground voltage VSS. The second switch signal S2 may be applied to a gate electrode of the second NMOS transistor M2.

As the operation frequency indicated by the PFM voltage control signal SPFM is increased, the turn-on frequency of the NMOS transistor M1 and M2 is increased and thus a voltage F2V of the switching node NC is decreased.

The filter circuit Rf, Cf1 and Cf2 may generate the conversion voltage Vc by filtering the voltage F2V of the switching node NC. The filter circuit Rf, Cf1 and Cf2 may act as a low pass filter and the configuration of the filter circuit may be implemented variously.

Figure 5:
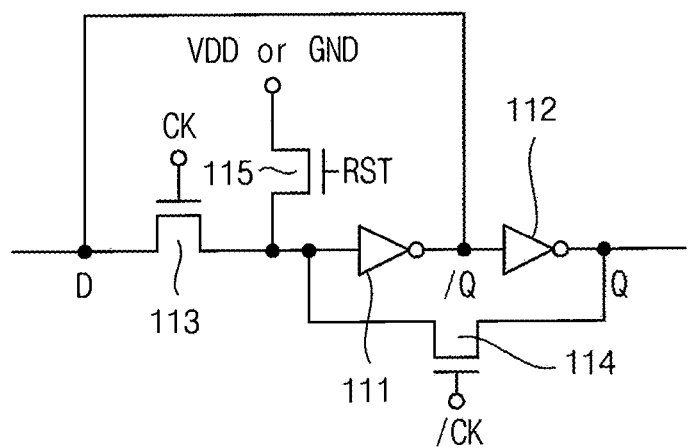
FIG. 5 is a circuit diagram illustrating an example embodiment of a frequency divider included in the frequency limit circuit of FIG. 4.
Figure 6:
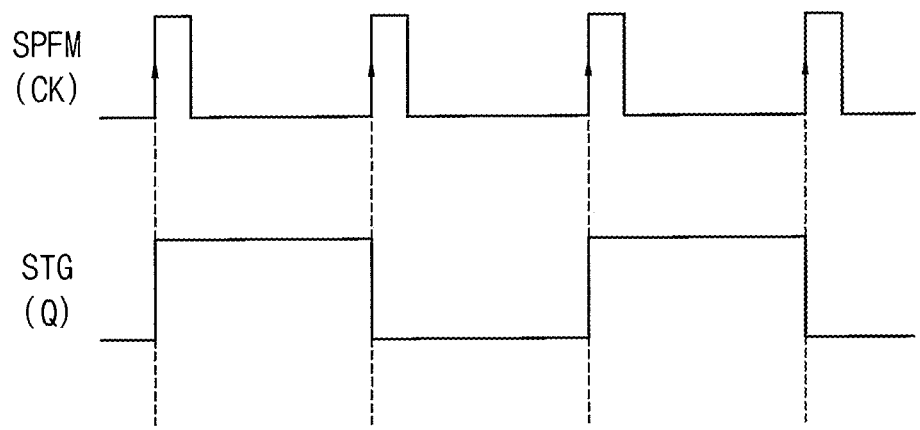
FIG. 6 is a timing diagram illustrating an operation of the frequency divider of FIG. 5.

FIG. 5 is a circuit diagram illustrating an example embodiment of a frequency divider 522 included in the frequency limit circuit of FIG. 4, and FIG. 6 is a timing diagram illustrating an operation of the frequency divider 522 of FIG. 5.

FIG. 5 illustrates an example of a positive-edge triggered flip-flop. The non-limiting example configuration of the flip-flop in FIG. 5 is presented for describing the toggling operation of the frequency divider 522 of FIG. 4, and the configuration of the flip-flop may be changed variously.

Referring to FIG. 5, the positive-edge triggered flip-flop may include a first inverter 111, a second inverter 112, a first switch 113, and/or a second switch 114. The output of the first inverter 111 is coupled to the input of the second inverter 112, and the output of the second inverter 112 is coupled to the input of the first inverter 111 via the second switch 114, thereby forming a latch configuration. In the example of FIG. 5, the output of the first inverter 111 corresponds to an inversion output terminal /Q, and the output of the second inverter 112 corresponds to a non-inversion output terminal Q. The first switch 113 is coupled between the data terminal D and the input of the first inverter 111, and the control terminal CK of the first switch 113 corresponds to a clock terminal. A clock signal CLK is applied on the control terminal CK of the first switch 113, and an inversion /CLK of the clock signal is applied on the control terminal /CK of the second switch 114.

The positive-edge triggered flip-flop of FIG. 5 may further include a reset switch 115 for initializing a state of the flip-flop. When the reset switch 115 is turned on in response to a reset signal RST, the inversion output terminal /Q and the output terminal Q are initialized respectively to logic low or logic high depending on the reset voltage VDD or GND.

When the clock signal CLK applied to the control terminal CK is logic low, the flip-flop of FIG. 5 is in a storage state that does not change the output even though the logic level of the data terminal D is changed. When the clock signal CLK transitions from logic low to logic high, that is, at the rising edge of the clock signal CLK, the logic level of the data terminal D is transferred to the non-inversion output terminal Q.

The flip-flop such that the logic state is determined in synchronization with the edge of the signal applied to the clock terminal CK is referred to as an edge triggered flip-flop, and the flip-flop of FIG. 5 corresponds to a positive-edge triggered flip-flop.

The positive-edge triggered flip-flop may perform toggling when the inversion output terminal /Q is coupled to the data terminal D. When the clock signal CLK applied to the control terminal CK transitions to logic low, the second switch 114 is turned on, and the data terminal D is set to a logic level opposite to that at the non-inversion output terminal Q but the state of the flip-flop is not changed since the first switch 113 is turned off.

When the clock signal CLK in FIG. 5 transitions to logic high, the first switch 113 is turned on, and the logic level of the inversion output terminal is applied to the input of the first inverter 111, thereby inverting the logic state of the non-inverting output terminal Q. As such, the positive-edge triggered flip-flop performs toggling by inverting the storage state from logic high to logic low or from logic low to logic high at each rising edge of the clock signal CLK applied to the control terminal CK Referring to FIGS. 5 and 6, when the PFM voltage control signal SPFM is applied to the control terminal CK of the rising-edge triggered flip-flop of FIG. 5, the toggling signal STG may be generated through the output terminal Q such that the toggling signal transitions in synchronization with the rising edge of the PFM voltage control signal SPFM.

Figure 7:
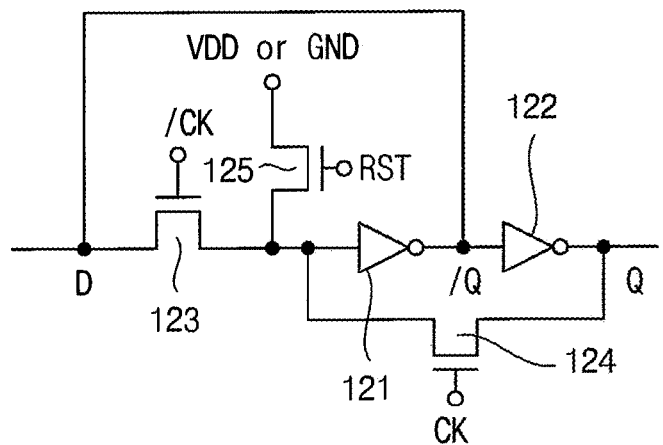
FIG. 7 is a circuit diagram illustrating an example embodiment of a frequency divider included in the frequency limit circuit of FIG. 4.
Figure 8:
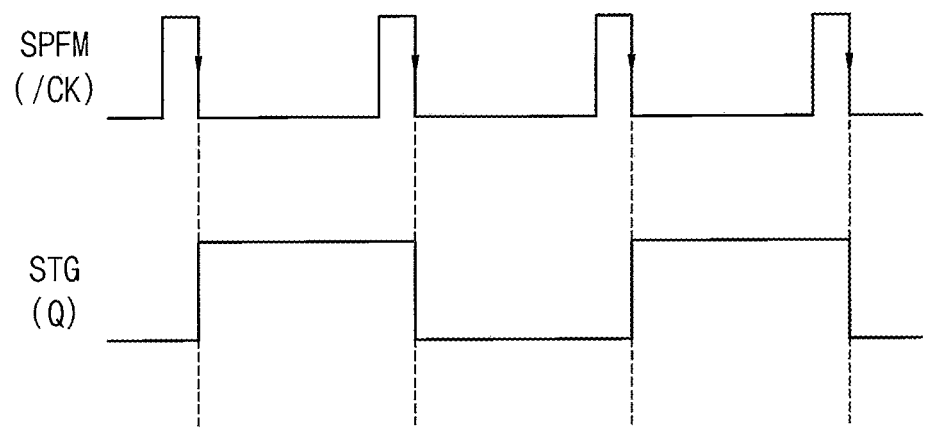
FIG. 8 is a timing diagram illustrating an operation of the frequency divider of FIG. 7.

FIG. 7 is a circuit diagram illustrating an example embodiment of a frequency divider 522 included in the frequency limit circuit of FIG. 4, and FIG. 8 is a timing diagram illustrating an operation of the frequency divider 522 of FIG. 7.

FIG. 7 illustrates an example of a positive-edge triggered flip-flop. The non-limiting example configuration of the flip-flop in FIG. 7 is presented for describing the toggling operation of the frequency divider 522 of FIG. 4, and the configuration of the flip-flop may be changed variously.

Referring to FIG. 7, may include a first inverter 121, a second inverter 122, a first switch 123, and/or a second switch 124, and may further include a reset switch 125. The negative-edge triggered flip-flop of FIG. 7 has a configuration similar to the positive-edge triggered flip-flop of FIG. 5, but the inversion /CLK of the clock signal CLK is applied to the control gate /CK of the first switch 123, and the clock signal CLK is applied to the control gate CK of the second switch 124. That is, the flip-flops of FIGS. 5 and 7 are different in that the control terminals CK and/CK are exchanged.

The negative-edge triggered flip-flop of FIG. 7 performs toggling in response to the falling edges of the clock signal CLK whereas the positive-edge triggered flip-flop of FIG. 5 performs toggling in response to the rising edges of the clock signal CLK. When the clock signal CLK applied to the control terminal CK transitions to logic high, the second switch 124 is turned on, and the data terminal D is set to the logic level opposite to that of the non-inversion output terminal Q but the state of the flip-flop is not changed since the first switch 123 is turned off.

When the clock signal CLK transitions to logic low, the first switch 123 is turned on, and the logic level of the inversion output terminal /Q is applied to the input of the first inverter 121, thereby inverting the logic state of the non-inverting output terminal Q. As such, the negative-edge triggered flip-flop performs toggling by inverting the storage state from logic high to logic low or from logic low to logic high at each falling edge of the clock signal CLK applied to the control terminal CK.

Referring to FIGS. 7 and 8, when the PFM voltage control signal SPFM is applied to the control terminal /CK of the falling-edge triggered flip-flop of FIG. 7, the toggling signal STG may be generated through the output terminal Q such that the toggling signal transitions in synchronization with the falling edge of the PFM voltage control signal SPFM.

The frequency divider 522 of FIG. 4 may include one edge triggered flip-flop as described with reference to FIGS. 5 through 8. In some example embodiments, the frequency of the toggling signal STG is half the operation frequency indicated by the PFM voltage control signal SPFM.

Figure 9:
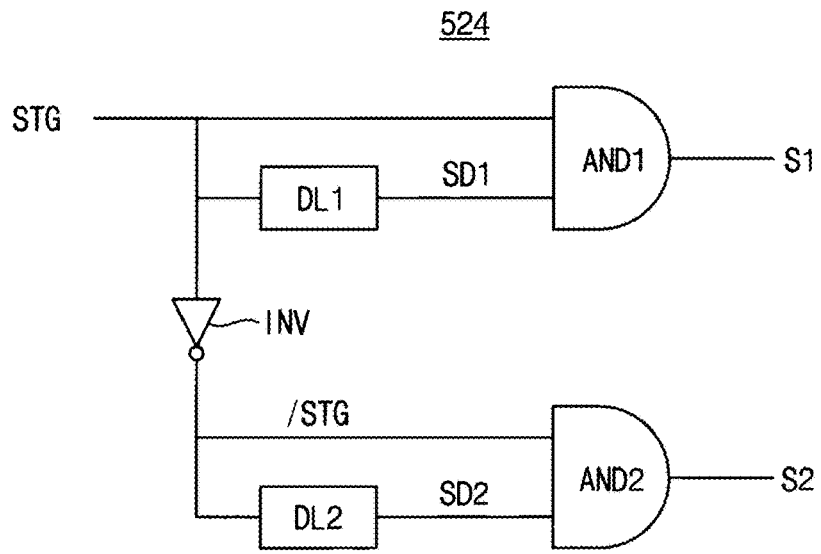
FIG. 9 is a diagram illustrating an example embodiment of a switch signal generator included on the frequency limit circuit of FIG. 4.
Figure 10:
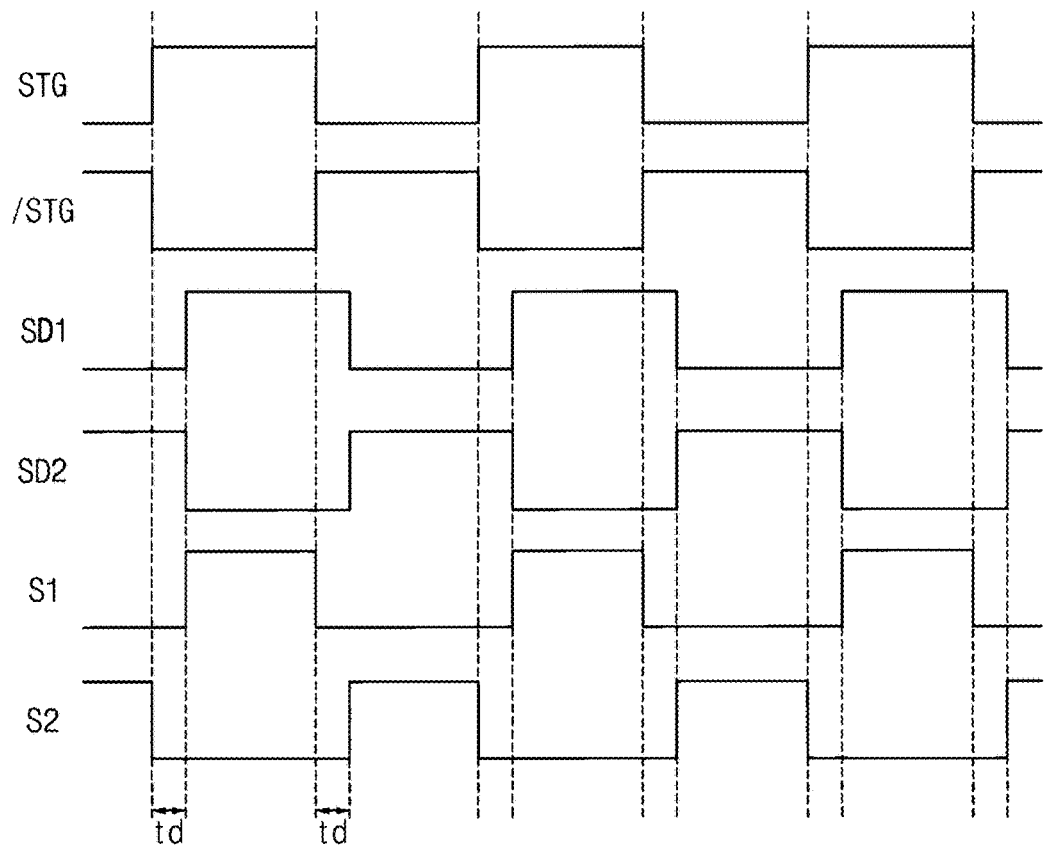
FIG. 10 is a timing diagram illustrating an operation of the switch signal generator of FIG. 9.

FIG. 9 is a diagram illustrating an example embodiment of a switch signal generator 524 included in the frequency limit circuit of FIG. 4, and FIG. 10 is a timing diagram illustrating an operation of the switch signal generator 524 of FIG. 9.

Referring to FIG. 9, a switch signal generator 524 may include a first delay circuit DL1, a first AND gate AND1, an inverter INV, a second delay circuit DL2 and/or a second AND gate AND2.

Referring to FIGS. 9 and 10, the first delay circuit DL1 may generate a first delay signal SD1 by delaying a toggling signal STG by a delay time td. The first AND gate AND1 may generate a first switch signal S1 by performing an AND logic operation on the toggling signal STG and the first delay signal SD1.

The inverter INV may generate an inverted toggling signal /STG by inverting the toggling signal STG. The second delay circuit DL2 may generate a second delay signal SD2 by delaying the inverted toggling signal /STG by the delay time td. The second AND gate AND2 may generate a second switch signal S2 by performing an AND logic operation on the inverted toggling signal /STG and the second delay signal SD2.

As a result, the switch signal generator 524 may be implemented as a non-overlap circuit configured to adjust timings of the first switch signal S1 and the second switch signal S2 such that one of the first switch signal S1 and the second signal S2 may be activated after the delay time td from a time point when the other of the first switch signal S1 and the second switch signal S2 is deactivated.

Figure 11:
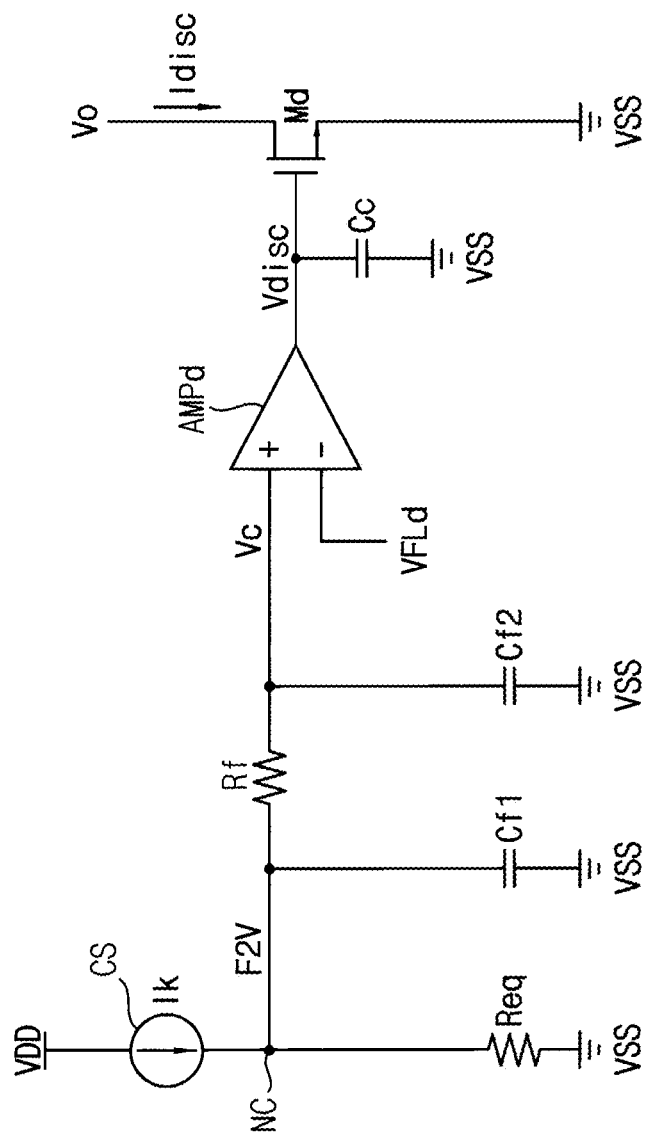
FIG. 11 is a diagram illustrating an equivalent circuit of the frequency limit circuit of FIG. 4.
Figure 12:
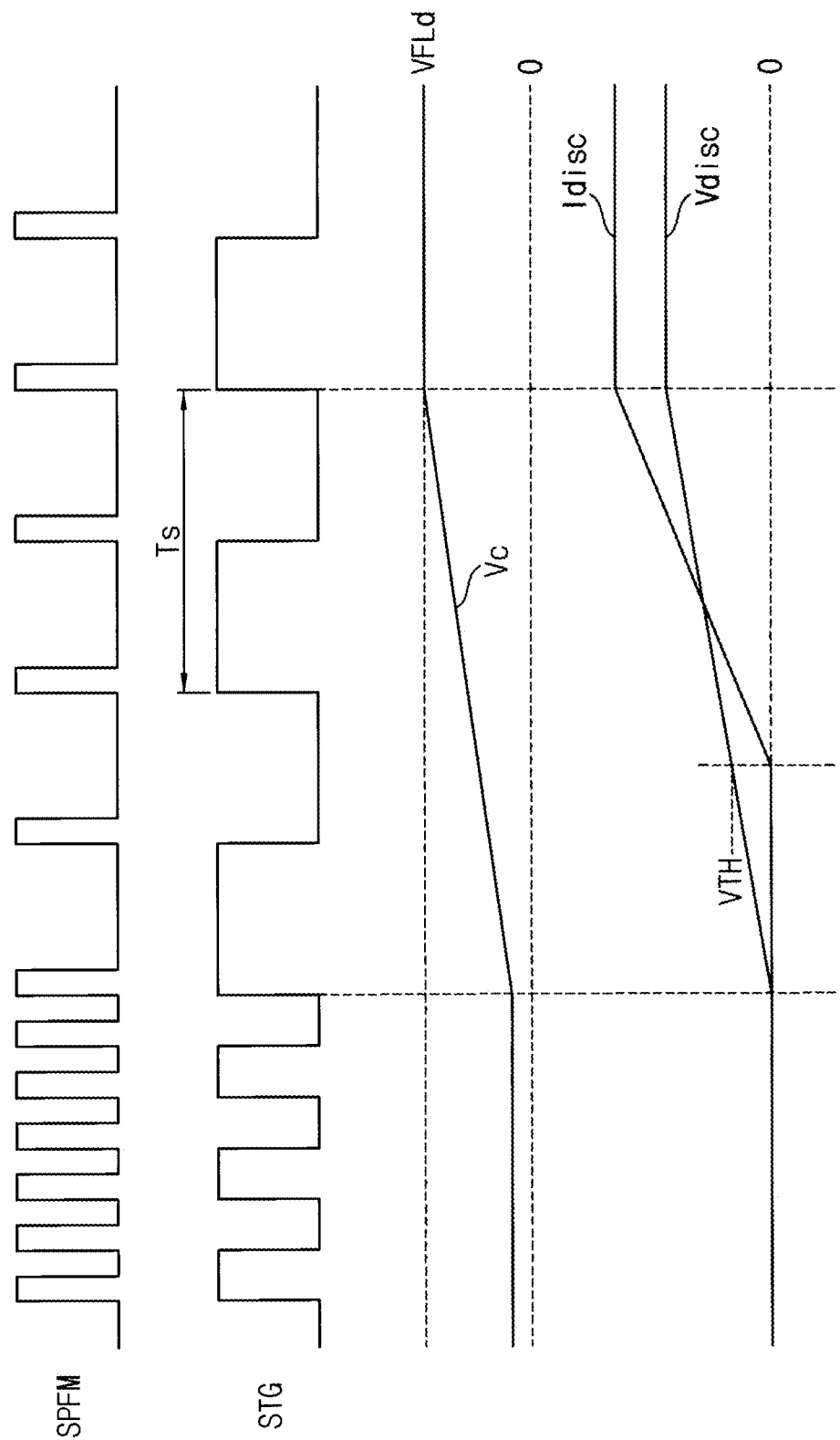
FIG. 12 is a timing diagram illustrating an operation of a DC-DC converter including a frequency limit circuit according to example embodiments.
Figure 13:
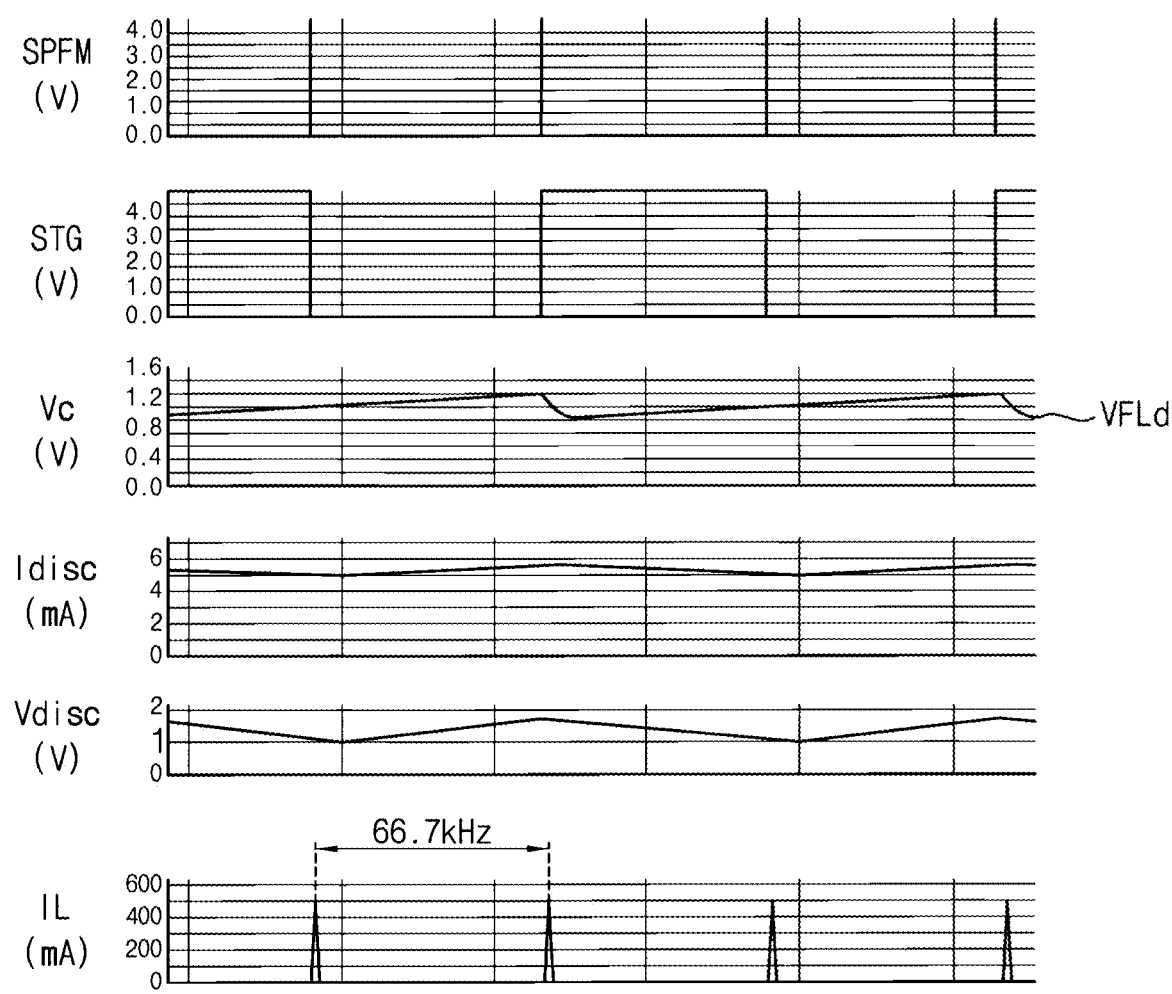
FIG. 13 is a waveform diagram illustrating an operation of a DC-DC converter including a frequency limit circuit according to example embodiments.

FIG. 11 is a diagram illustrating an equivalent circuit of the frequency limit circuit 501 of FIG. 4, FIG. 12 is a timing diagram illustrating an operation of a DC-DC converter 11 including a frequency limit circuit 501 according to example embodiments, and FIG. 13 is a waveform diagram illustrating an operation of a DC-DC converter 11 including a frequency limit circuit 501 according to example embodiments. FIG. 12 illustrates an overall operation of the DC-DC converter 11 and FIG. 13 illustrates an operation when the DC-DC converter 11 is saturated near the lowest limit frequency.

Referring to FIGS. 4 through 13, the operation frequency of the DC-DC converter 11 may be represented by the PFM voltage control signal SPFM and it is converted to the toggling signal STG having the 50% duty ratio by the ½ frequency division operation of the frequency divider 522. Even though the width of the pulses included in the PFM voltage control signal SPFM is narrow, the toggling signal STG having the wide pulse width may secure the stable operation of the switch signal generator 524 and the switched capacitor circuit 526.

The toggling signal STG may be used as the input of the switch signal generator 524 or the non-overlap circuit and the non-overlap circuit 524 may generate the switch signals S1 and S2 such that the transistors M1 and M2 in the switched capacitor circuit 526 may not be turned on simultaneously. In some example embodiments, the frequency divider 522 may be omitted and the PFM voltage control signal SPFM instead of the toggling signal STG may be used as the input of the non-overlap circuit 524.

During the switching operation by the switch signals S1 and S2, the transistors M1 and M2 and the capacitor Cw act as an equivalent resistance Req as illustrated in FIG. 11. The amount of the compensation current Ic or the discharging current Idisc may be adjusted by a negative feedback operation such that the conversion voltage Vc may converge to the frequency limit voltage VFL or the lowest frequency limit voltage VFLd. Through the equivalent resistance analysis, the relation between the operation frequency and the lowest frequency limit voltage VFLd may be represented by Equation 1 and Equation 2.

$$Vc=VFLd=Ik*Req \qquad \text{Equation 1}$$

$$Req=1/(f1*Cw)=2/(fo*Cw) \qquad \text{Equation 2}$$

In Equation 2, fo indicates the lowest limit of the operation frequency and f1 indicates the frequency of the toggling signal STG. When the PFM voltage control signal SPFM is divided by ½, fo is equal to 2*f1. As a result, the lowest limit fo of the operation frequency may be represented by Equation 3.

$$fo=(2*Ik)/(VFLd*Cw) \qquad \text{Equation 3}$$

As shown in Equation 3, the lowest limit fo of the operation frequency may be determined by controlling the lowest frequency limit voltage VFLd, the static current Ik and the capacitance Cw. As a result, the lowest value fo of the operation frequency may be inversely proportional to the lowest frequency limit voltage VFLd.

The filter circuit Rf, Cf1 and Cf2 may be a low pass filter to remove high frequency components of the voltage F2V of the switching node NC. The amplifier AMPd and the capacitor Cc may generate the discharging voltage Vdisc by amplifying the difference between the lowest frequency limit voltage VFLd and the conversion voltage Vc. The NMOS transistor Md may adjust the amount of the discharging current Idisc based on the discharging voltage Vdisc.

FIG. 12 illustrates the operations of the nodes in FIG. 11. As shown in FIG. 12, the frequency divider 522 may detect the rising edge of the PFM voltage control signal SPFM and convert the PFM voltage control signal SPFM to the toggling signal STG having the duty ratio of 50%. When the operation frequency (1/Ts) is decreased, the equivalent frequency Req is increased and thus the conversion voltage Vc is increased. In response to the increased conversion voltage Vc, the discharging voltage Vdisc controlling the discharging current Idisc is increased. The NMOS transistor Md is turned on when the discharging voltage Vdisc exceeds the threshold voltage VTH of the NMOS transistor Md and the discharging current Idisc is increased as the discharging voltage Vdisc is increased.

The DC-DC converter 11 of FIG. 3 is an example embodiment to restrict the operation frequency to be higher than the lowest limit. The frequency of the PFM voltage control signal SPFM is decreased as the load current is decreased in the PFM mode. In contrast, the conversion voltage Vc and the discharging voltage Vdisc are increased as the frequency of the PFM voltage control signal SPFM is decreased. The discharging current Idisc flowing through the NMOS transistor Md is increased as the discharging voltage Vdisc is increased. As a result, the increased discharge current Idisc may compensate for the decreased load current. Through such negative feedback operation, the frequency of the PFM voltage control signal SPFM or the operation frequency of the DC-DC converter 11 may be restricted to be higher than the lowest limit. As described with reference to Equation 3, the operation frequency may be inversely proportional to the lowest frequency limit voltage VFLd.

FIG. 13 illustrates an operation when the DC-DC converter 11 is saturated near the lowest limit frequency. In FIG. 13, voltages are represented by a volt (V) and currents are represented by a mili ampere (mA). As shown in FIG. 13, when the lowest frequency limit voltage VFLd is set to about 0.8V, the frequency of the current IL flowing through the inductor L in FIG. 3 may be restricted to be higher than 66.7 kHz.

Recently circuits of various functions are integrated in a system and some circuits may be affected by noises in an audible frequency range or electromagnetic interference to degrade performance of the system. Accordingly the operation frequency of the voltage converter may be controlled to reduce or prevent noise and/or interference in mobile devices, electric motor vehicles, display devices, etc.

Conventionally a fixed compensation voltage is applied to a gate electrode of a transistor to control a discharging current flowing from an output node to a ground voltage. In some example embodiments, the discharging current flows regardless of a load current and thus unnecessary power consumption may be caused. In addition, the discharging current may be affected largely by deviations in manufacturing process, voltage and/or temperature. The parameters for restricting the operation frequency of the voltage converter have to be determined in the stage of designing the voltage converter considering the various conditions, which may cause a burden on circuit design.

In contrast, the frequency limit circuit according to example embodiments may adaptively adjust the amount of the compensation current or the discharging current depending on the amount of the load current through the negative feedback operation. As such, the frequency limit circuit and the DC-DC converter including the frequency limit circuit according to example embodiments may more efficiently limit the operation frequency of the DC-DC converter and/or more efficiently reduce audible frequency noises and/or electromagnetic interference in devices and systems including the DC-DC converter by adjusting the compensation current through the negative feedback operation.

Figure 14:
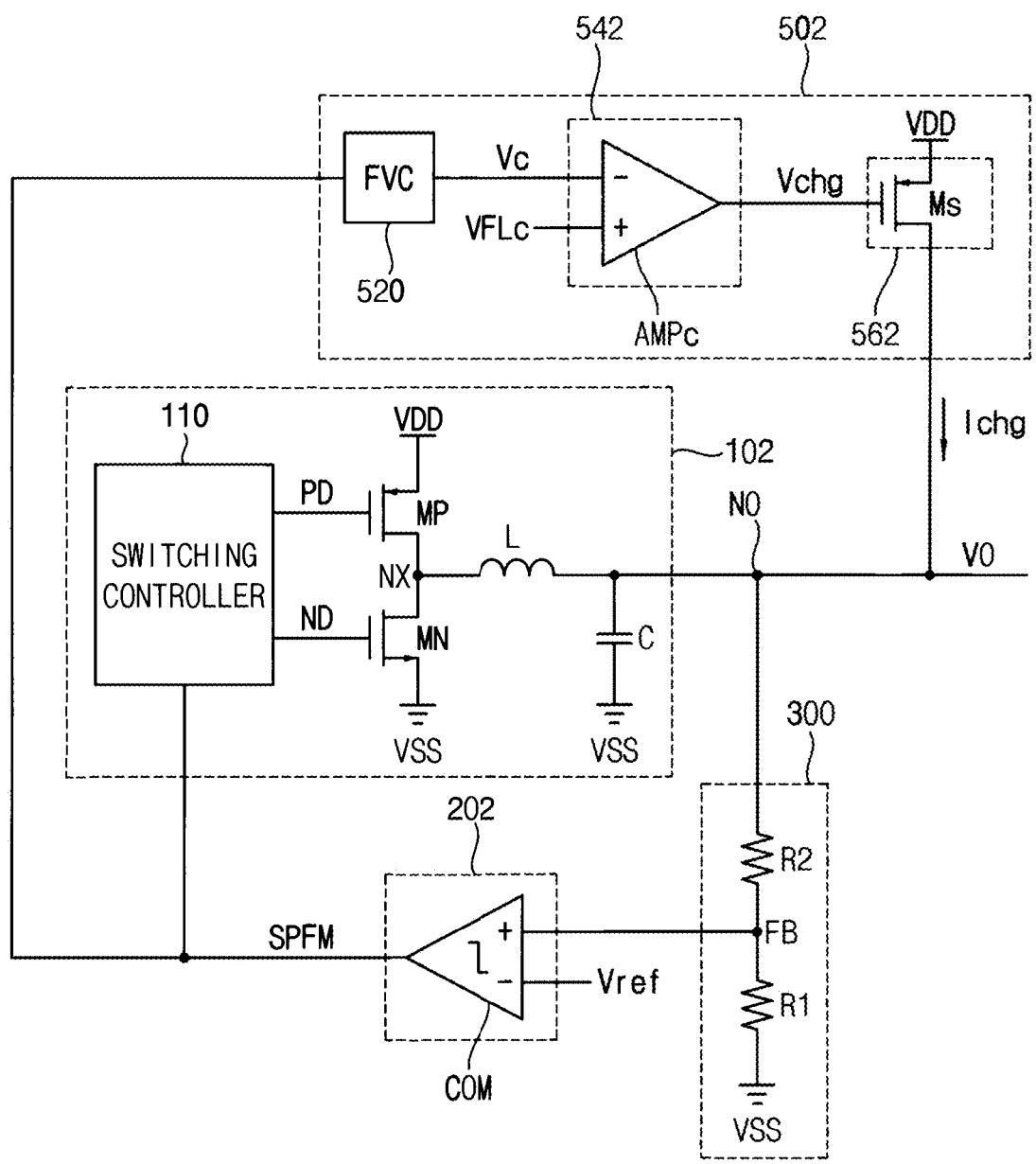
FIG. 14 is a diagram illustrating a DC-DC converter including a frequency limit circuit to restrict a highest limit of an operation frequency in a PFM mode according to example embodiments.

FIG. 14 is a diagram illustrating a DC-DC converter 12 including a frequency limit circuit 502 to restrict a highest limit of an operation frequency in a PFM mode according to example embodiments.

Referring to FIG. 14, a DC-DC converter 12 may include a voltage conversion circuit 102, a voltage control circuit 202, a feedback circuit 300 and/or a frequency limit circuit 502.

The voltage conversion circuit 102 may generate an output voltage VO at an output node NO by converting an input voltage, that is, a power supply voltage VDD, based on a PFM voltage control signal SPFM.

The voltage conversion circuit 102 may include a switching controller 110, a pull-up transistor MP, a pull-down transistor MN, an inductor L and/or a capacitor C.

The switching controller 110 may generate a pull-up control signal PD and a pull-down control signal ND based on the PFM voltage control signal SPFM. The pull-up transistor MP may be turned on to pull up a voltage of a switching node NX when the pull-up control signal PD is activated in a low level. The pull-down transistor MN may be turned on to pull down the voltage of the switching node NX when the pull-down control signal ND is activated in a high level. The inductor L and the capacitor C may act as a low pass filter and filter the voltage of the switching node NX to output the output voltage VO to the output node NO. The switching circuit including the pull-up transistor MP and the pull-down transistor MN and the low pass filter including the inductor L and the capacitor may be implemented variously.

The voltage control circuit 202 may generate the PFM voltage control signal SPFM based on the feedback voltage FB that is proportional to the output voltage VO. In some example embodiments, the voltage control circuit 202 may include a comparator COM. The comparator COM may include a positive input terminal receiving the feedback voltage FB, a negative input terminal receiving a reference voltage Vref, and an output terminal generating the PFM voltage control signal SPFM. The feedback circuit 300 may generate the feedback voltage FB proportional to the output voltage VO as described with reference to FIG. 2.

The frequency limit circuit 502 may include a frequency-voltage converter FVC 520, a compensation voltage generator 542 and/or a compensator 562.

The frequency-voltage converter 520 may generate a conversion voltage Vc proportional to the operation frequency of the DC-DC converter 12 based on the PFM voltage control signal SPFM indicating the operation frequency. The frequency-voltage converter 520 is the same as described with reference to FIGS. 2 through 11.

The compensation voltage generator 542 may generate a compensation voltage Vcmp, that is, a charging voltage Vchg, based on a difference between the conversion voltage Vc and a highest frequency limit voltage VFLc. The compensator 562 may adjust a compensation current Ic, that is, a charging current Ichg, at the output node NO of the DC-DC converter 12 based on the charging voltage Vchg to restrict the operation frequency.

In some example embodiments, the compensation voltage generator 542 may include an amplifier AMPc including a positive input terminal receiving the highest frequency limit voltage VFLc, a negative input terminal receiving the conversion voltage Vc, and an output terminal generating the charging voltage Vchg. In addition, the compensator 562 may include a PMOS transistor Ms connected between the output node NO of the DC-DC converter 12 and the power supply voltage VDD, and the charging voltage Vchg may be applied to a gate electrode of the PMOS transistor Ms.

The DC-DC converter 12 of FIG. 14 is an example embodiment to restrict the operation frequency to be lower than the highest limit. The frequency of the PFM voltage control signal SPFM is increased as the load current is increased in the PFM mode. In contrast, the conversion voltage Vc and the discharging voltage Vdisc are decreased as the frequency of the PFM voltage control signal SPFM is increased. The charging current Ichg flowing through the PMOS transistor Ms is increased as the charging voltage Vchg is decreased. As a result, the increased charge current Idisc may compensate for the increased load current. Through such negative feedback operation, the frequency of the PFM voltage control signal SPFM or the operation frequency of the DC-DC converter 12 may be restricted to be lower than the highest limit. In the similar way as described with reference to Equation 3, the operation frequency may be inversely proportional to the highest frequency limit voltage VFLc.

Figure 15:
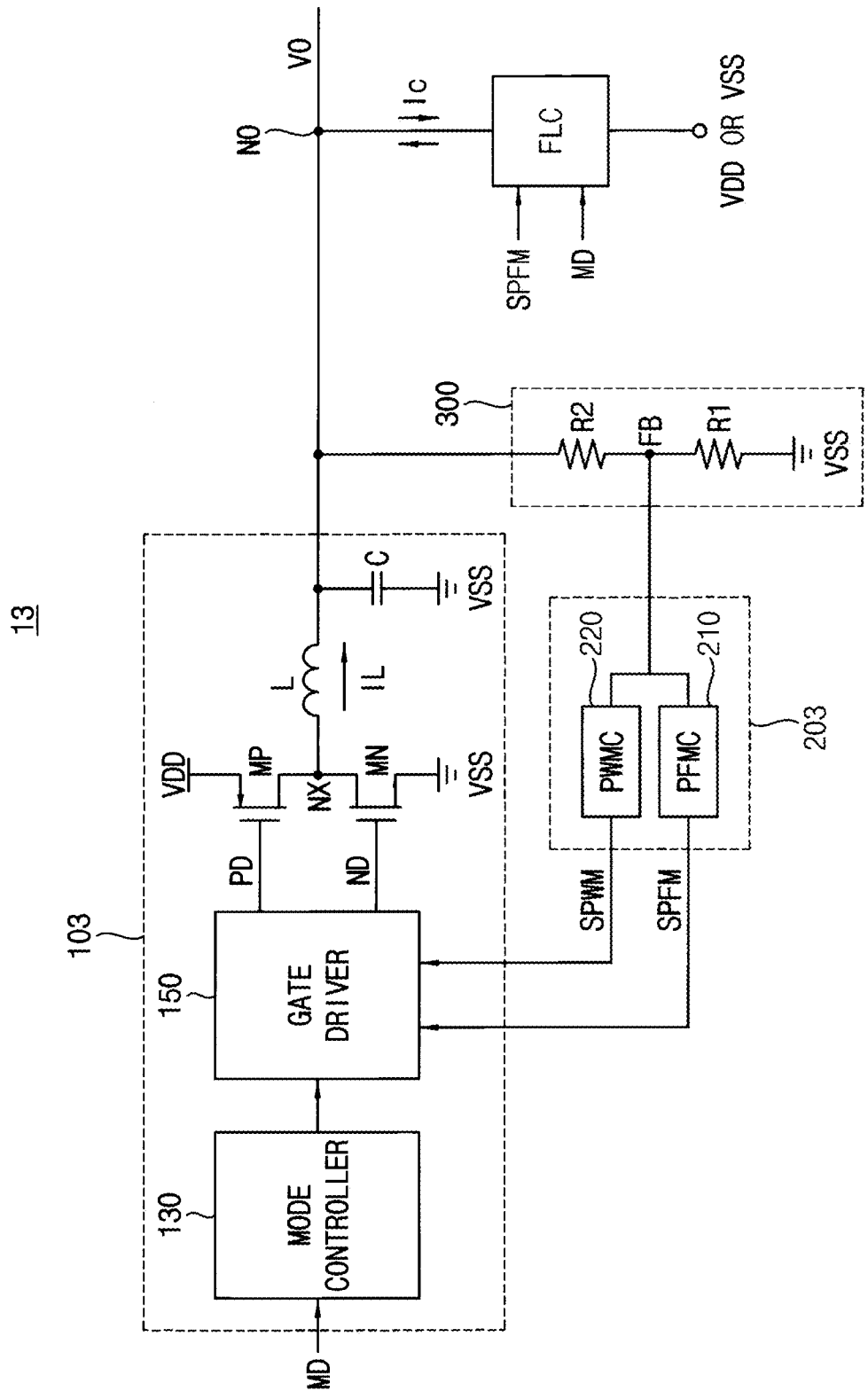
FIG. 15 is a diagram illustrating a DC-DC converter including a frequency limit circuit according to example embodiments.
Figure 16:
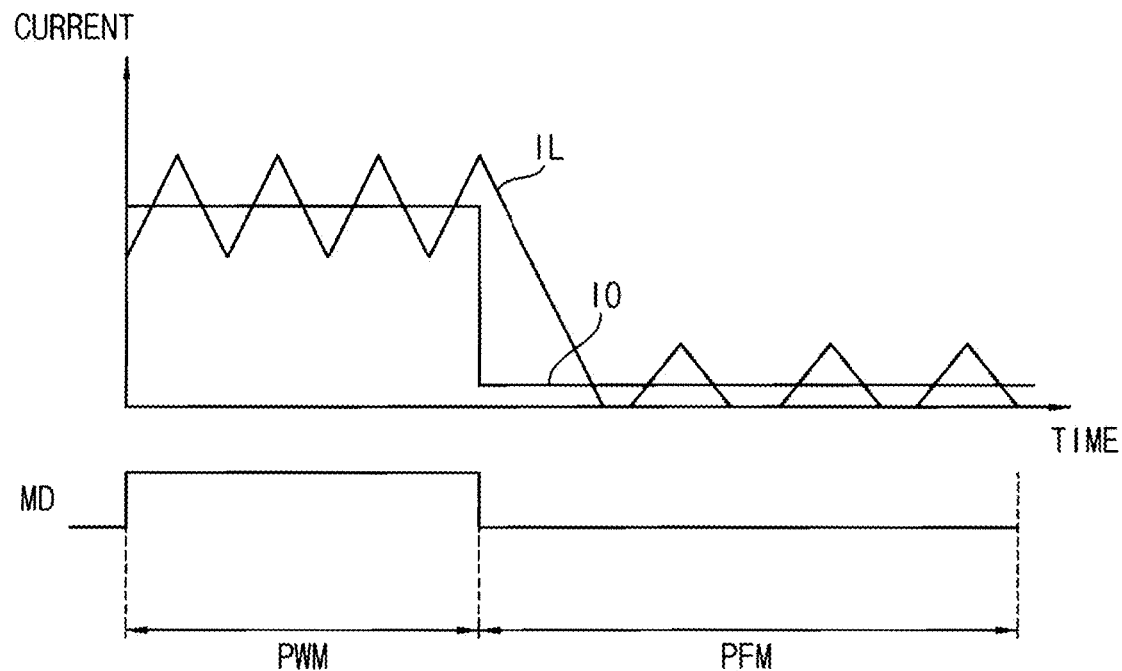
FIG. 16 is a diagram illustrating operation modes of the DC-DC converter of FIG. 15.

FIG. 15 is a diagram illustrating a DC-DC converter 13 including a frequency limit circuit FLC according to example embodiments, and FIG. 16 is a diagram illustrating operation modes of the DC-DC converter 13 of FIG. 15.

Referring to FIG. 15, a DC-DC converter 13 may include a voltage conversion circuit 103, a voltage control circuit 203, a feedback circuit 300 and/or a frequency limit circuit FLC.

The voltage conversion circuit 103 may generate an output voltage VO at an output node NO by converting an input voltage, that is, a power supply voltage VDD, based on one of a PWM voltage control signal SPWM and a PFM voltage control signal SPFM. The PWM voltage control signal SPWM and the PFM voltage control signal SPFM may be included in the voltage control signal SVC in FIG. 2. The configuration of the voltage conversion circuit 103 of FIG. 15 corresponds to a buck converter (or step-down converter).

The voltage conversion circuit 103 may include a mode controller 130, a gate driver 150, a pull-up transistor MP, a pull-down transistor MN, an inductor L and/or a capacitor C.

The mode controller 130 may control the gate driver 150 based on a mode signal MD such that the gate driver 150 may operate in a PWM mode or in a PFM mode. The gate driver 150 may generate a pull-up control signal PD and a pull-down control signal ND based on the PFM voltage control signal SPFM. The pull-up transistor MP may be turned on to pull up a voltage of a switching node NX when the pull-up control signal PD is activated in a low level. The pull-down transistor MN may be turned on to pull down the voltage of the switching node NX when the pull-down control signal ND is activated in a high level. The inductor L and the capacitor C may act as a low pass filter and filter the voltage of the switching node NX to output the output voltage VO to the output node NO. The switching circuit including the pull-up transistor MP and the pull-down transistor MN and the low pass filter including the inductor L and the capacitor C may be implemented variously.

The configuration of the voltage conversion circuit 103 may be modified variously depending on the function of the DC-DC converter 13.

In some example embodiments, the voltage conversion circuit 103 may have a configuration corresponding to a buck converter (or step-down converter), as illustrated in FIG. 15, to convert a relatively high DC voltage to a relatively low DC voltage.

In some example embodiments, the voltage conversion circuit 103 may have a configuration corresponding to a boost converter (or step-up converter) to convert a relatively low DC voltage to a relatively high DC voltage.

In some example embodiments, the voltage conversion circuit 103 may have a configuration corresponding to a buck-boost converter to convert an input DC voltage to an output DC voltage having a higher or lower voltage level than the input DC voltage.

The voltage control circuit 203 may generate the voltage control signal SVC including the PWM voltage control signal SPWM and the PFM voltage control signal SPFM based on the feedback voltage FB that is proportional to the output voltage VO. The voltage control circuit 203 may generate the PWM voltage control signal SPWM or the PFM voltage control signal SPFM depending on operation modes. In some example embodiments, as illustrated in FIG. 15, the voltage control circuit 203 may include a PFM controller PFMC 210 and/or a PWM controller PWMC 220. The PFM controller 210 may generate the PFM voltage control signal SPFM as the voltage control signal SVC in the PFM mode while the load current flowing from the output node of the DC-DC converter to a load is lower than a reference value. The PWM controller 220 may generate the PWM voltage control signal SPWM as the voltage control signal SVC in the PWM mode while the load current is higher than the reference value. The gate driver 150 may operate based on the PFM voltage control signal SPFM in the PFM mode and based on the PWM voltage control signal SPWM in the PWM mode, under control of the mode controller 130.

FIG. 16 illustrates schematically the load current IO and the inductor current IL in the PWM mode and the PFM mode. As illustrated in FIG. 16, the DC-DC converter 13 may operate in the PWM mode when the load current IO is higher than a reference value that is predetermined or alternatively, desired properly and operate in the PFM mode when the load current IO is lower than the reference value. For example, the logic high level of the mode signal MD may indicate the PWM mode and the logic low level of the mode signal MD may indicate the PFM mode.

The feedback circuit 300 may generate the feedback voltage FB that is proportional to the output voltage VO. For example, as illustrated in FIG. 15, the feedback circuit 300 may include resistors R1 and R2 to generate the feedback voltage FB corresponding to a ratio of resistance values of the resistors R1 and R2, but example embodiments are not limited thereto. In the example embodiment of FIG. 15, the feedback voltage FB is determined by a relation of FB=VO*R1/(R1+R2).

The frequency limit circuit FLC may restrict the operation frequency of the DC-DC converter 13 based on the voltage control signal SVC in the PFM mode. The frequency limit circuit FLC may be disabled in the PWM mode when the DC-DC converter 13 operates based on a fixed operation frequency and enabled in the PFM mode when the DC-DC converter 13 operates based on a variable operation frequency. For example, the frequency limit circuit FLC may receive the mode signal MD as illustrated in FIG. 15, to be enabled selectively in response to the mode signal MD.

As described above, the frequency limit circuit FLC may include a frequency-voltage converter, a compensation voltage generator and/or a compensator. The frequency-voltage converter may generate a conversion voltage proportional to the operation frequency of the DC-DC converter based on the PFM voltage control signal indicating the operation frequency. The compensation voltage generator may generate a compensation voltage based on a difference between the conversion voltage and a frequency limit voltage. The compensator may adjust a compensation current at an output node of the DC-DC converter based on the compensation voltage to restrict the operation frequency.

In some example embodiments, as described with reference to FIG. 3, the frequency limit voltage may correspond to a lowest frequency limit voltage VFLd to restrict the operation frequency to be higher than a lowest value, and the compensation current may correspond to a discharging current Idisc flowing from the output node NO of the DC-DC converter 13 to a ground voltage VSS. In some example embodiments, the compensation voltage generator may include an amplifier including a positive input terminal receiving the conversion voltage Vc, a negative input terminal receiving the lowest frequency limit voltage VFLd, and an output terminal generating the compensation voltage. In addition, the compensator may include an NMOS transistor connected between the output node NO of the DC-DC converter 13 and the ground voltage VSS, and the compensation voltage may be applied to a gate electrode of the NMOS transistor.

In some example embodiments, as described with reference to FIG. 14, the frequency limit voltage may correspond to a highest frequency limit voltage VFLc to restrict the operation frequency to be lower than a highest value, and the compensation current may correspond to a charging current Ichg flowing from the power supply voltage VDD to the output node NO of the DC-DC converter 13. In some example embodiments, the compensation voltage generator may include an amplifier including a positive input terminal receiving the highest frequency limit voltage VFLc, a negative input terminal receiving the conversion voltage Vc, and an output terminal generating the compensation voltage. In addition, the compensator may include a PMOS transistor connected between the output node NO of the DC-DC converter 13 and the power supply voltage VDD, and the compensation voltage may be applied to a gate electrode of the PMOS transistor.

Figure 17:
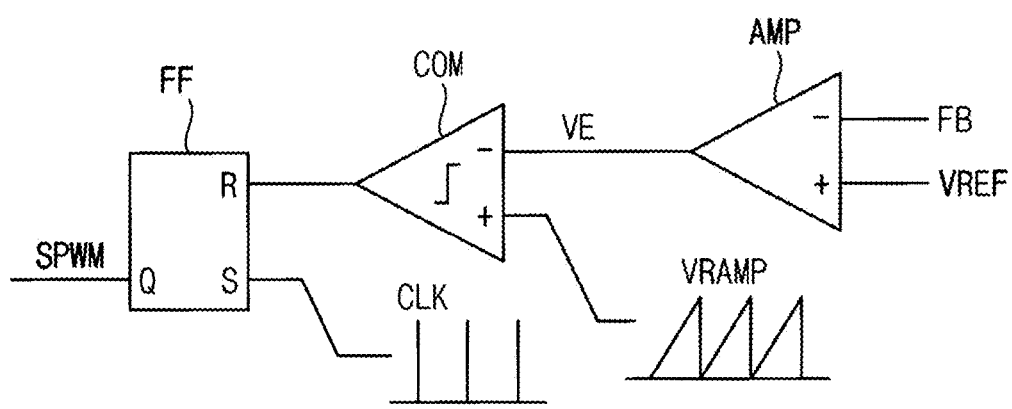
FIG. 17 is a diagram illustrating an example embodiment of a PWM controller included in the DC-DC converter of FIG. 15.
Figure 18:
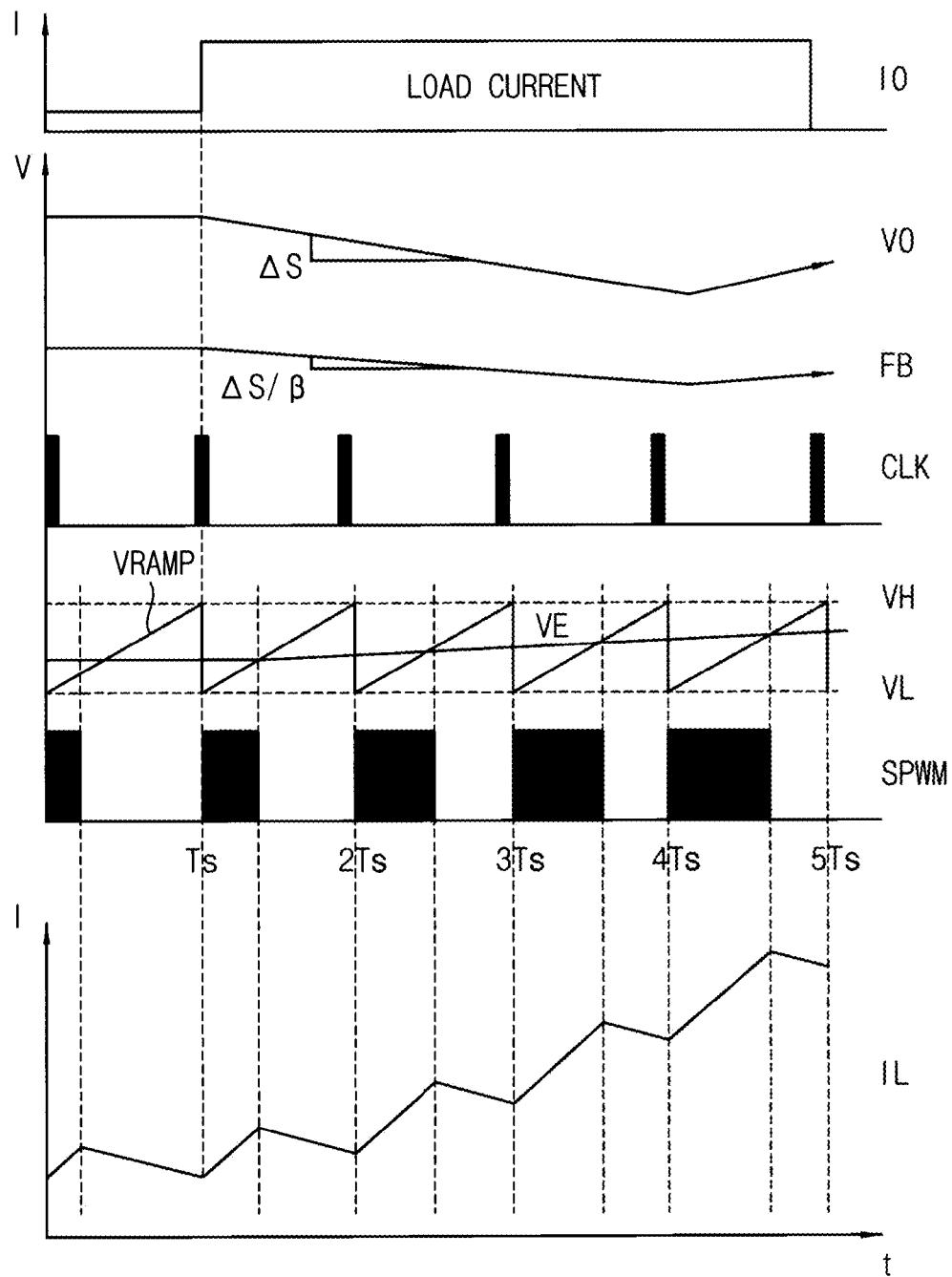
FIG. 18 is a diagram illustrating an operation of the DC-DC converter of FIG. 15 in a PWM mode.

FIG. 17 is a diagram illustrating an example embodiment of a PWM controller 220 included in the DC-DC converter 13 of FIG. 15, and FIG. 18 is a diagram illustrating an operation of the DC-DC converter 13 of FIG. 15 in a PWM mode.

FIG. 18 illustrates a process of increasing the inductor current IL in the PWM mode when the load current IO is increased. In FIG. 18, $\Delta S$ indicates the slope of the output voltage VO of the DC-DC converter and $\Delta S/\beta$ indicates the slop of the feedback voltage FB.

Referring to FIGS. 17 and 18, a PWM controller 220 may include an amplifier AMP, a comparator COM and/or a flip-flop FF. The amplifier AMP may generate a voltage VE based on the feedback voltage FB and a reference voltage VREF. The comparator COM may compare the voltage VE with a ramp signal VRAMP. The flip-flop FF may receive the output of the comparator COM at a reset terminal R, receive a clock signal CLK at a set terminal S and output the PWM voltage control signal SPWM at an output terminal Q. The operation of the PWM mode is well known to those skilled art and detailed descriptions are omitted.

As illustrated in FIG. 18, if the load current IO is increased abruptly at a time point Ts, the output voltage VO and the feedback voltage FB are decreased and thus the duty ratio of the PWM voltage control signal SPWM is increased. The inductor current IL of the voltage conversion circuit 103 in FIG. 15 is increased as the duty ratio of the PWM voltage control signal SPWM is increased. As a result, the decreased output voltage VO may be compensated by the increased duty ratio to maintain a target level of the output voltage VO.

Even though not illustrated in the figures, if the load current IO is decreased abruptly, the output voltage VO is increased and thus the duty ratio of the PWM voltage control signal SPWM is decreased. The inductor current IL is decreased as the duty ratio of the PWM voltage control signal SPWM is decreased. As a result, the increased output voltage VO may be compensated by the decreased duty ratio to maintain the target level of the output voltage VO.

As illustrated in FIG. 18, the PWM voltage control signal SPWM may be generated in response to the clock signal CLK that is activated periodically at time points Ts~STs. In other words, the DC-DC converter 13 of FIG. 15 may operate based on a fixed operation frequency corresponding to the frequency of the clock signal CLK.

FIGS. 19 and 20 are diagrams illustrating example embodiments of a voltage conversion circuit included in a DC-DC converter according to example embodiments. Hereinafter, descriptions repeated with the above descriptions may be omitted.

FIG. 19 illustrates a voltage conversion circuit 104 corresponding to a boost converter (or step-up converter). The connection of the transistors MP and MN and the inductor L is different in the voltage conversion circuit 104 in comparison with the voltage conversion circuit 103 in FIG. 15. Through the switching operation of the transistors MP and MN, power may be supplied to the output node NO and the output voltage VO may be boosted to a higher voltage level than the power supply voltage VDD.

FIG. 20 illustrates a voltage conversion circuit 105 corresponding to a buck-boost converter. In comparison with the voltage conversion circuit 103 of FIG. 15, the voltage conversion circuit 105 further includes transistors MP2 and MN2 in addition to the transistors MP1 and MN1. Through the switching operation of the transistors MP1, MN1, MP2 and MN2, the voltage conversion circuit 105 may generate the output voltage VO having a voltage level higher or lower than the power supply voltage VDD.

The operations of the boost converter (or step-up converter) and the buck-boost converter are well known to those skilled in the art and the detailed descriptions are omitted.

Figure 21:
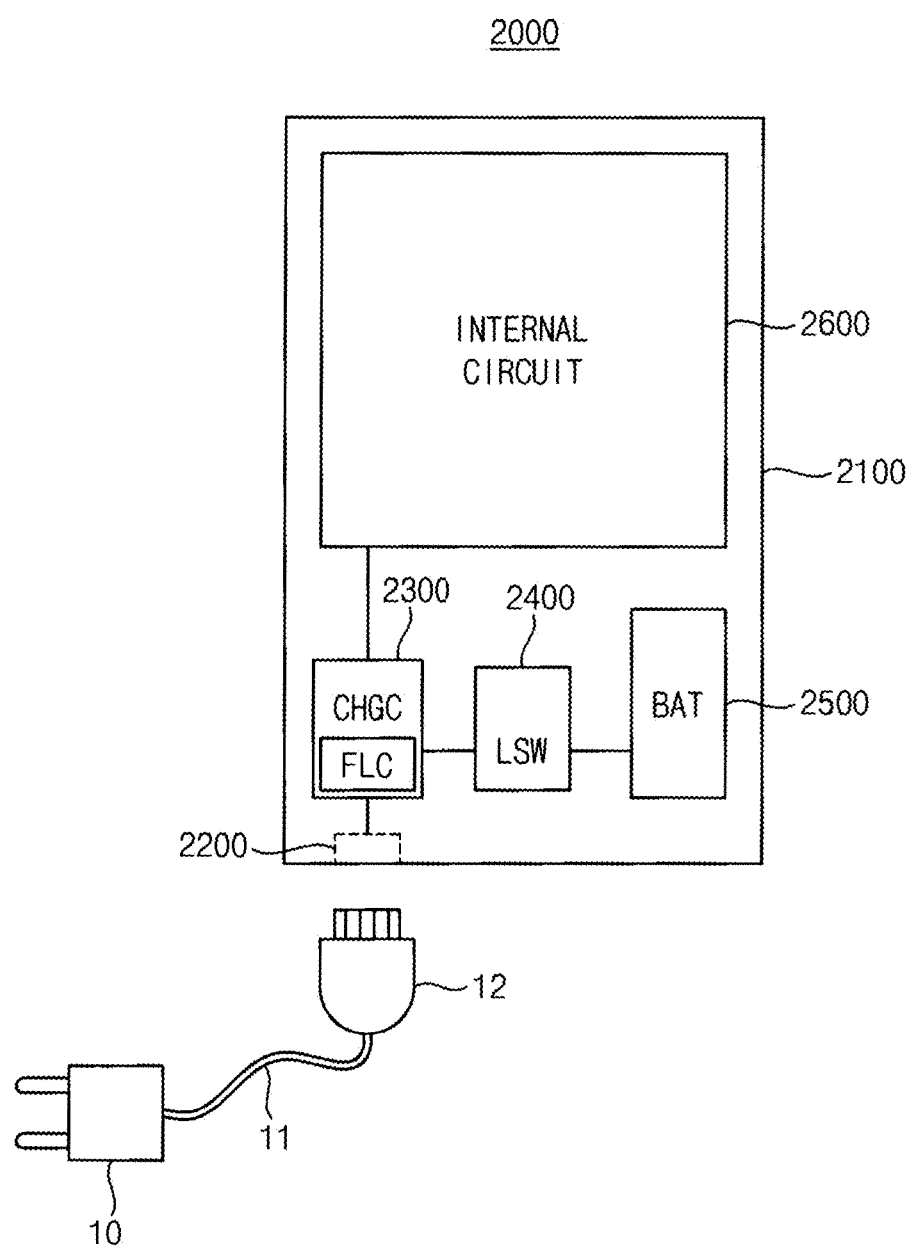
FIGS. 21 and 22 are diagrams illustrating a system including a frequency limit circuit according to example embodiments.
Figure 22:
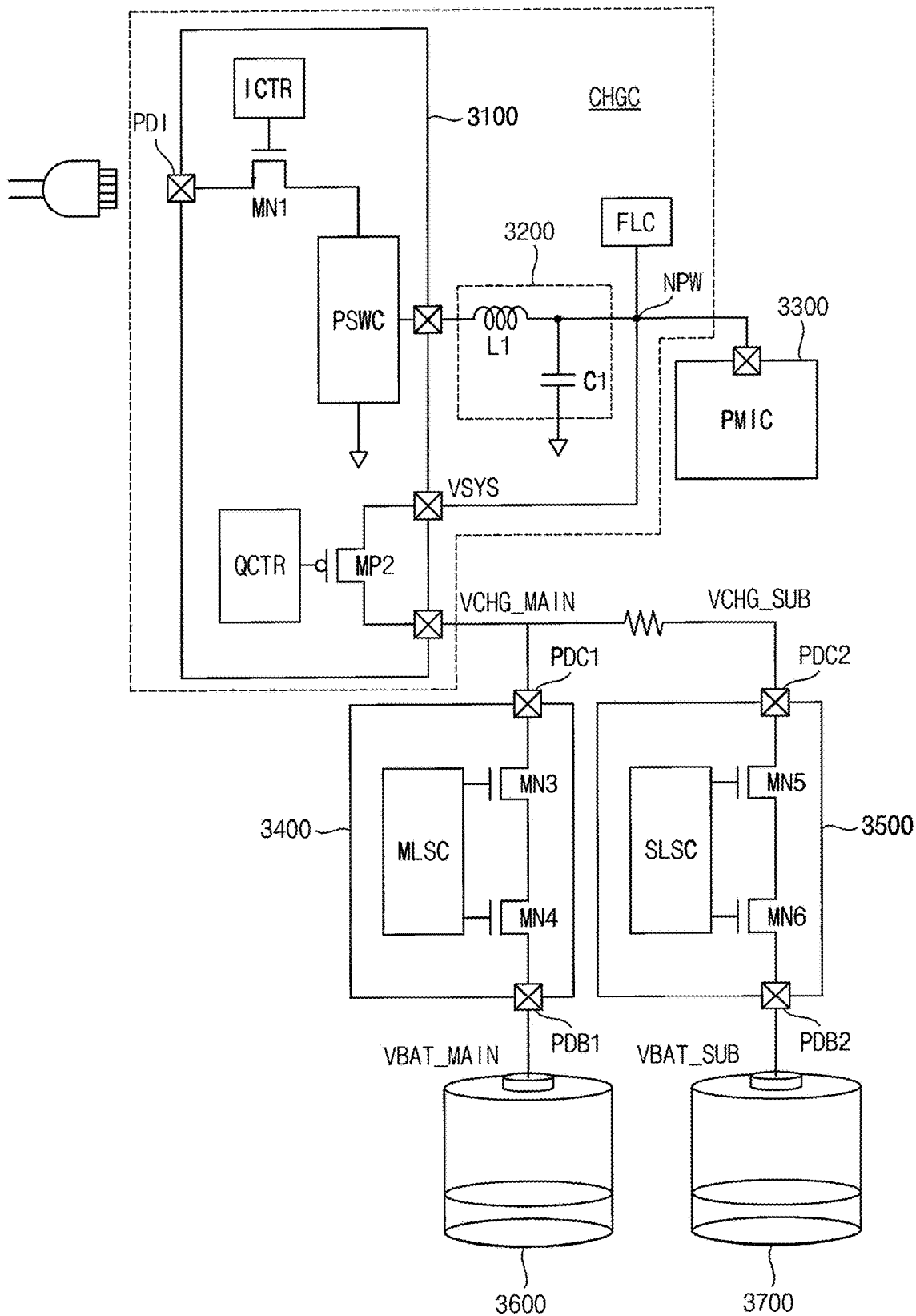

FIGS. 21 and 22 are diagrams illustrating a system including a frequency limit circuit according to example embodiments.

Referring to FIG. 21, a system 2000 may include a mobile device 2100 such as a smartphone and an AC-DC wall adaptor or a travel adaptor 10 to supply power to the mobile device 2100. The travel adaptor 10 may be connected to a connector 2200 of the mobile device 2100 through a cable 11 and a jack 12 to supply power to the mobile device 2100.

The mobile device 2100 may include a charging control circuit CHGC 2300, a load switch circuit LSW 2400, a battery BAT 2500 and/or an internal circuit 2600.

The charging control circuit 2300 may change the DC voltage from the travel adaptor 10 to provide charging power to the battery 2500 and/or operating power to the internal circuit 2600. When the travel adaptor 10 is removed. The charged power in the battery may be provided to the internal circuit 2600.

The charging control circuit 2300 may include a frequency limit circuit FLC according to example embodiments as described above to efficiently restrict the operation frequency of the charging control circuit 2300.

Referring to FIG. 22, an electronic device or an electronic system 3000 may include a charging control circuit CHGC, a power management integrated circuit PMIC 3300, a main load switch circuit 3400, a sub load switch circuit 3500, a main battery 3600 and/or a sub battery 3700.

The charging control circuit CHGC may include a voltage converter 3100 and/or a low pass filter 3200. The voltage converter 3100 may include a power switching circuit PSWC, transistors MN1 and MP1 and controllers ICTR and QCTR to control the transistors MN1 and MP1 and the power switching circuit PSWC. The low pass filter 3200 may be implemented with a combination of an inductor L1 and a capacitor C1, and so on. The power switching circuit PSWC may perform a complementary switching operation and/or a self-balancing operation to compensate for effects due to mismatch.

The voltage converter 3100 may receive power from the travel adaptor through the input pad PDI and provide operating power through the power node NPW to the internal circuits such as the power management integrated circuit 3300. In addition, the voltage converter 3100 may provide charging power to the main battery 3600 and the sub battery 3700. The power node NPW may correspond to the above-described output node NO, and the voltage VSYS on the power node NPW may correspond to the above-described output voltage VO. A frequency limit circuit FLC according to example embodiments as described above may be connected to the power node NPW to efficiently restrict the operation frequency of the voltage converter 3100.

The main load switch circuit 3400 may be connected to the voltage converter 3100 through a first charging pad PDC1 to which a main charging voltage VCHG_MAIN is applied and connected to the main battery 3600 through a first battery pad PDB1 to which a main battery voltage VBAT_MAIN is applied. The sub load switch circuit 3500 may be connected to the voltage converter 3100 through a second charging pad PDC2 to which a sub charging voltage VCHG_SUB is applied and connected to the sub battery 3700 through a second battery pad PDB2 to which a sub battery voltage VBAT_SUB is applied. The main charging voltage VCHG_MAIN and the sub charging voltage VCHG_SUB may be different due to the parasitic resistance along the intermediate path.

The main load switch circuit 3400 may include a main charging transistor MN4, a main discharging transistor MN3 and a main load switch controller MLSC. The sub load switch circuit 3500 may include a sub charging transistor MN6, a sub discharging transistor MN5 and a sub load switch controller SLSC. Each of the main load switch controller MLSC and the sub load switch controller SLSC may be configured to selectively operate in the voltage control mode or current control mode based on the magnitude of the charging current and/or the discharging current as described above.

As described above, the frequency limit circuit, the DC-DC converter and the associated method according to example embodiments may more efficiently limit the operation frequency of the DC-DC converter and more efficiently reduce audible frequency noises and/or electromagnetic interference in devices and systems including the DC-DC converter by adjusting the compensation current through a negative feedback operation.

The present disclosure may be applied to any electronic devices and systems requiring voltage conversion. For example, the present disclosure may be applied to systems such as be a memory card, a solid state drive (SSD), an embedded multimedia card (eMMC), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

Any of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The foregoing is illustrative of example embodiments and is not to be construed as limiting thereof. Although a few example embodiments have been described, those skilled in the art will readily appreciate that many modifications are possible in the example embodiments without materially departing from the present disclosure.

What is claimed is:

1. A frequency limit circuit included in a direct current (DC)-DC converter, the frequency limit circuit comprising:
 a frequency-voltage converter configured to generate a conversion voltage proportional to an operation frequency of the DC-DC converter based on a pulse-frequency modulation (PFM) voltage control signal indicating the operation frequency;
 a compensation voltage generator configured to generate a compensation voltage based on a difference between the conversion voltage and a frequency limit voltage; and a compensator configured to adjust a compensation current at an output node of the DC-DC converter based on the compensation voltage to restrict the operation frequency.

2. The frequency limit circuit of claim 1, wherein the frequency limit voltage corresponds to a lowest frequency limit voltage to restrict the operation frequency to be higher than a lowest value, and the compensation current corresponds to a discharging current flowing from the output node of the DC-DC converter to a ground voltage.

3. The frequency limit circuit of claim 2, wherein the lowest value is inversely proportional to the lowest frequency limit voltage.

4. The frequency limit circuit of claim 2, wherein the compensation voltage generator comprises:
an amplifier including a positive input terminal receiving the conversion voltage, a negative input terminal receiving the lowest frequency limit voltage, and an output terminal generating the compensation voltage.

5. The frequency limit circuit of claim 2, wherein the compensator comprises:
an N-channel metal oxide semiconductor (NMOS) transistor connected between the output node of the DC-DC converter and the ground voltage, wherein the compensation voltage is applied to a gate electrode of the NMOS transistor.

6. The frequency limit circuit of claim 1, wherein the frequency-voltage converter generates a toggling signal transitioning in synchronization with a rising edge or a falling edge of pulses included in the PFM voltage control signal and generates the conversion voltage based on the toggling signal.

7. The frequency limit circuit of claim 1, wherein the frequency-voltage converter comprises:
a switch signal generator configured to generate a first switch signal and a second switch signal that are alternatively activated based on the PFM voltage control signal;
a current source configured to provide a current to a switching node;
a switched capacitor circuit configured to discharge the switching node based on the first switch signal and the second switch signal; and
a filter circuit configured to generate the conversion voltage by filtering a voltage of the switching node.

8. The frequency limit circuit of claim 7, wherein the frequency-voltage converter further comprises:
a divider configured to generate a toggling signal transitioning in synchronization with a rising edge or a falling edge of pulses included in the PFM voltage control signal and provide the toggling signal to the switch signal generator.

9. The frequency limit circuit of claim 8, wherein the divider comprises:
at least one edge triggered flip-flop including a clock terminal receiving the PFM voltage control signal, an output terminal generating the toggling signal, a data terminal and an inversion output terminal such that the inversion output terminal is electrically connected to the data terminal.

10. The frequency limit circuit of claim 7, wherein the switch signal generator comprises:
a non-overlap circuit configured to adjust timings of the first switch signal and the second switch signal such that one of the first switch signal and the second signal is activated after a delay time from a time point when the other of the first switch signal and the second switch signal is deactivated.

11. The frequency limit circuit of claim 7, wherein the switched capacitor circuit comprises:
a capacitor including a first electrode and a second electrode, wherein the first electrode of the capacitor is connected to a ground voltage;
a first NMOS transistor connected between the second electrode of the capacitor and the switching node, wherein the first switch signal is applied to a gate electrode of the first NMOS transistor; and
a second NMOS transistor connected between the second electrode of the capacitor and the ground voltage, wherein the second switch signal is applied to a gate electrode of the second NMOS transistor.

12. The frequency limit circuit of claim 1, wherein the frequency limit voltage corresponds to a highest frequency limit voltage to restrict the operation frequency to be lower than a highest value, and the compensation current corresponds to a charging current flowing from a power supply voltage to the output node of the DC-DC converter.

13. The frequency limit circuit of claim 12, wherein the compensation voltage generator comprises:
an amplifier including a positive input terminal receiving the highest frequency limit voltage, a negative input terminal receiving the conversion voltage, and an output terminal generating the compensation voltage.

14. The frequency limit circuit of claim 12, wherein the compensator comprises:
a P-channel metal oxide semiconductor (PMOS) transistor connected between the output node of the DC-DC converter and the power supply voltage, wherein the compensation voltage is applied to a gate electrode of the PMOS transistor.

15. The frequency limit circuit of claim 1, wherein an amount of the compensation current is adjusted by a negative feedback operation such that the conversion voltage converges to the frequency limit voltage.

16. A direct current (DC)-DC converter comprising:
a voltage conversion circuit configured to generate an output voltage at an output node by converting a power supply voltage based on a voltage control signal;
a voltage control circuit configured to generate the voltage control signal based on a feedback voltage proportional to the output voltage; and
a frequency limit circuit configured to restrict an operation frequency of the DC-DC converter based on the voltage control signal, the frequency limit circuit comprising:
a frequency-voltage converter configured to generate a conversion voltage proportional to the operation frequency of the DC-DC converter based on a pulse-frequency modulation (PFM) voltage control signal indicating the operation frequency;
a compensation voltage generator configured to generate a compensation voltage based on a difference between the conversion voltage and a frequency limit voltage; and
a compensator configured to adjust a compensation current at an output node of the DC-DC converter based on the compensation voltage to restrict the operation frequency.

17. The DC-DC converter of claim 16, wherein the voltage control circuit comprises:
a pulse-width modulation (PWM) controller configured to generate a PWM voltage control signal as the voltage control signal in a PWM mode while a load current flowing from the output node of the DC-DC converter to a load is higher than a reference value; and a PFM controller configured to generate the PFM voltage control signal as the voltage control signal in a PFM mode while the load current is lower than the reference value.

18. The DC-DC converter of claim 17, wherein the frequency limit circuit is disabled in the PWM mode and enabled in the PFM mode.

19. The DC-DC converter of claim 16, wherein the frequency limit voltage corresponds to a lowest frequency limit voltage to restrict the operation frequency to be higher than a lowest value, and the compensation current corresponds to a discharging current flowing from the output node of the DC-DC converter to a ground voltage.

20. A method of controlling an operation of a direct current (DC)-DC converter, the method comprising:

detecting an operation frequency of the DC-DC converter operating in a pulse-frequency modulation (PFM) mode;

generating a conversion voltage proportional to the operation frequency;

generating a compensation voltage based on a difference between the conversion voltage and a frequency limit voltage; and adjusting a compensation current at an output node of the DC-DC converter based on the compensation voltage to restrict the operation frequency.

* * * * *